US008812730B2

(12) United States Patent
Vos et al.

(10) Patent No.: US 8,812,730 B2
(45) Date of Patent: Aug. 19, 2014

(54) METHOD AND APPARATUS FOR NETWORK PORT AND NETWORK ADDRESS TRANSLATION

(75) Inventors: Gustav Gerald Vos, Surrey (CA); Richard Thomas Kavanaugh, Encinitas, CA (US); Andrew Hasley Watson Mitchell, North Vancouver (CA); William Yih Yuan Waung, Burnaby (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 75 days.

(21) Appl. No.: 13/109,342

(22) Filed: May 17, 2011

(65) Prior Publication Data

US 2012/0023257 A1 Jan. 26, 2012

Related U.S. Application Data

(63) Continuation-in-part of application No. PCT/CA2009/001622, filed on Nov. 17, 2009.

(60) Provisional application No. 61/115,412, filed on Nov. 17, 2008.

(51) Int. Cl.
*G06F 15/16* (2006.01)
(52) U.S. Cl.
USPC .......................................... 709/245; 370/389
(58) Field of Classification Search
USPC ................. 709/232, 203, 249, 201, 230, 246;
370/395.52, 217, 219, 229, 235, 241,
370/249, 352, 389, 392, 401
See application file for complete search history.

(56) References Cited

U.S. PATENT DOCUMENTS

| 4,825,193 A | 4/1989 | Siwiak et al. |
| 5,481,254 A | 1/1996 | Gaskill et al. |

(Continued)

FOREIGN PATENT DOCUMENTS

| CA | 2 172 372 | 5/1995 |
| CA | 2 248 577 | 11/2002 |

(Continued)

OTHER PUBLICATIONS

R. Braden, "Requirements for Internet Hosts—Communication Layers," Internet Engineering Task Force, Oct. 1989, 115 pages.

(Continued)

*Primary Examiner* — Anh-Vu Ly
*Assistant Examiner* — Gustavo Lopez-Vargas
(74) *Attorney, Agent, or Firm* — Vedder Price P.C.; Thomas J. Kowalski; Rebecca G. Rudich

(57) ABSTRACT

The present invention provides a method and apparatus for network port and network address translation. Several problems with limited addressability may occur when transmitting data packets between a terminal in a first network and a terminal in a second network that is outside the first network. Data forwarding rules are used to define if and how identifiers of data packets to be forwarded between the two networks correlate with each other. According to embodiments, a data forwarding rule includes a first identifier associated with the first network and a second identifier associated with the second network, wherein each identifier has two parts: a source address and source port number corresponding to a source network node, and a destination address and destination port number corresponding to a destination network node.

28 Claims, 10 Drawing Sheets

(56) References Cited

U.S. PATENT DOCUMENTS

| | | | |
|---|---|---|---|
| 5,606,668 A | 2/1997 | Shwed | |
| 5,996,021 A | 11/1999 | Civanlar et al. | |
| 6,049,834 A | 4/2000 | Khabardar et al. | |
| 6,058,431 A | 5/2000 | Srisuresh et al. | |
| 6,101,189 A | 8/2000 | Tsuruoka | |
| 6,161,144 A | 12/2000 | Michels et al. | |
| 6,182,185 B1 | 1/2001 | Stokes | |
| 6,353,614 B1 | 3/2002 | Borella et al. | |
| 6,363,421 B2 | 3/2002 | Barker et al. | |
| 6,453,358 B1 | 9/2002 | Michels et al. | |
| 6,456,357 B2 | 9/2002 | Ogura | |
| 6,549,519 B1 | 4/2003 | Daines et al. | |
| 6,553,000 B1 | 4/2003 | Ganesh et al. | |
| 6,579,663 B2 | 6/2003 | Wolf et al. | |
| 6,606,316 B1 | 8/2003 | Albert et al. | |
| 6,618,757 B1 | 9/2003 | Babbitt et al. | |
| 6,631,416 B2 | 10/2003 | Bendinelli et al. | |
| 6,680,943 B1 | 1/2004 | Gibson et al. | |
| 6,687,252 B1 | 2/2004 | Bertrand et al. | |
| 6,711,147 B1 | 3/2004 | Barnes et al. | |
| 6,751,191 B1* | 6/2004 | Kanekar et al. | 370/217 |
| 6,804,707 B1 | 10/2004 | Ronning | |
| 6,865,184 B2 | 3/2005 | Thubert et al. | |
| 6,937,863 B1 | 8/2005 | Gordon et al. | |
| 6,944,672 B2 | 9/2005 | Crow et al. | |
| 6,954,790 B2 | 10/2005 | Forslöw | |
| 6,956,854 B2 | 10/2005 | Ganesh et al. | |
| RE38,902 E | 11/2005 | Srisuresh et al. | |
| 6,993,595 B1 | 1/2006 | Luptowski et al. | |
| 6,996,628 B2 | 2/2006 | Keane et al. | |
| 6,999,753 B2 | 2/2006 | Beckmann et al. | |
| 7,023,847 B2 | 4/2006 | Zhang | |
| 7,028,333 B2 | 4/2006 | Tuomenoksa et al. | |
| 7,031,328 B2 | 4/2006 | Thubert et al. | |
| 7,043,564 B1 | 5/2006 | Cook et al. | |
| 7,051,116 B1 | 5/2006 | Rodriguez-Val et al. | |
| 7,058,973 B1 | 6/2006 | Sultan | |
| 7,068,667 B2 | 6/2006 | Foster et al. | |
| 7,076,594 B2 | 7/2006 | Benedetto et al. | |
| 7,085,854 B2 | 8/2006 | Keane et al. | |
| 7,126,948 B2 | 10/2006 | Gooch et al. | |
| 7,139,822 B2 | 11/2006 | Guenther et al. | |
| 7,139,828 B2 | 11/2006 | Alkhatib et al. | |
| 7,159,109 B2 | 1/2007 | Egevang | |
| 7,177,657 B2 | 2/2007 | Hill et al. | |
| 7,181,766 B2 | 2/2007 | Bendinelli et al. | |
| 7,190,696 B1 | 3/2007 | Manur et al. | |
| 7,197,661 B1 | 3/2007 | Reynolds et al. | |
| 7,215,777 B2 | 5/2007 | Deen et al. | |
| 7,237,260 B2 | 6/2007 | Yu et al. | |
| 7,245,622 B2 | 7/2007 | Huitema | |
| 7,266,119 B2 | 9/2007 | Fan et al. | |
| 7,269,663 B2 | 9/2007 | Beier et al. | |
| 7,272,650 B2 | 9/2007 | Elgebaly et al. | |
| 7,293,108 B2 | 11/2007 | Warrier et al. | |
| 7,302,493 B1 | 11/2007 | Alles et al. | |
| 7,313,618 B2 | 12/2007 | Braemer et al. | |
| 7,333,453 B2 | 2/2008 | Wu et al. | |
| 7,340,535 B1 | 3/2008 | Alam | |
| 7,356,045 B2 | 4/2008 | Satapati et al. | |
| 7,362,760 B2 | 4/2008 | Wang | |
| 7,366,188 B2 | 4/2008 | Kim | |
| 7,370,194 B2 | 5/2008 | Morais et al. | |
| 7,379,475 B2 | 5/2008 | Minami et al. | |
| 7,386,641 B2 | 6/2008 | Xu et al. | |
| 7,406,534 B2 | 7/2008 | Syvänne et al. | |
| 7,411,917 B1 | 8/2008 | Hardie et al. | |
| 7,411,975 B1 | 8/2008 | Mohaban | |
| 7,426,194 B2 | 9/2008 | Shenfield et al. | |
| 7,441,043 B1 | 10/2008 | Henry et al. | |
| 7,443,859 B2 | 10/2008 | Sengodan | |
| 7,443,867 B2 | 10/2008 | El-Beik et al. | |
| 7,461,142 B2 | 12/2008 | Wadekar | |
| 7,464,121 B2 | 12/2008 | Barcia et al. | |
| 7,483,999 B2 | 1/2009 | Weyman | |
| 7,484,005 B2 | 1/2009 | Rodriguez-Val et al. | |
| 7,523,197 B2 | 4/2009 | Castaneda et al. | |
| 7,529,230 B2 | 5/2009 | Lewis et al. | |
| 7,529,810 B2 | 5/2009 | Goto et al. | |
| 7,577,746 B2 | 8/2009 | Shima | |
| 7,587,209 B2 | 9/2009 | Bianconi et al. | |
| 7,587,490 B2 | 9/2009 | Guenther et al. | |
| 7,606,191 B1 | 10/2009 | Breau et al. | |
| 7,606,588 B2 | 10/2009 | Griffin | |
| 7,609,701 B2* | 10/2009 | Yang et al. | 370/395.52 |
| 7,684,397 B2 | 3/2010 | Kim et al. | |
| 7,702,646 B2 | 4/2010 | Rabines et al. | |
| 7,730,339 B2 | 6/2010 | Wang | |
| 7,756,074 B2 | 7/2010 | Beckmann et al. | |
| 7,827,293 B2 | 11/2010 | Spicer et al. | |
| 7,881,318 B2 | 2/2011 | Herzog et al. | |
| 7,949,785 B2 | 5/2011 | Alkhatib et al. | |
| 8,023,432 B2 | 9/2011 | Herzog | |
| 8,050,684 B2 | 11/2011 | Lewis et al. | |
| 8,179,822 B2 | 5/2012 | Shiina | |
| 8,228,848 B2 | 7/2012 | Vos et al. | |
| 8,298,828 B2 | 10/2012 | Diebold et al. | |
| 8,301,753 B1* | 10/2012 | Melvin | 709/224 |
| 8,316,152 B2 | 11/2012 | Geltner et al. | |
| 8,458,067 B2 | 6/2013 | Arguelles et al. | |
| 8,532,609 B2 | 9/2013 | Spector | |
| 2001/0052006 A1 | 12/2001 | Barker et al. | |
| 2002/0004834 A1 | 1/2002 | Guenther et al. | |
| 2002/0026503 A1 | 2/2002 | Bendinelli et al. | |
| 2002/0026531 A1 | 2/2002 | Keane et al. | |
| 2002/0029276 A1 | 3/2002 | Bendinelli et al. | |
| 2002/0056008 A1 | 5/2002 | Keane et al. | |
| 2002/0091859 A1 | 7/2002 | Tuomenoksa et al. | |
| 2002/0107980 A1 | 8/2002 | Kawaguchi | |
| 2002/0111180 A1 | 8/2002 | Hogan et al. | |
| 2002/0129165 A1* | 9/2002 | Dingsor et al. | 709/246 |
| 2002/0131395 A1 | 9/2002 | Wang | |
| 2002/0138622 A1 | 9/2002 | Dorenbosch et al. | |
| 2002/0143773 A1 | 10/2002 | Spicer et al. | |
| 2002/0184316 A1 | 12/2002 | Thomas et al. | |
| 2003/0007486 A1* | 1/2003 | March et al. | 370/389 |
| 2003/0108055 A1* | 6/2003 | Damon et al. | 370/401 |
| 2003/0177236 A1 | 9/2003 | Goto et al. | |
| 2003/0182448 A1 | 9/2003 | Gooch et al. | |
| 2003/0223449 A1 | 12/2003 | Hill et al. | |
| 2004/0122929 A1 | 6/2004 | Wadekar | |
| 2004/0148406 A1 | 7/2004 | Shima | |
| 2004/0153858 A1* | 8/2004 | Hwang | 714/43 |
| 2004/0176112 A1 | 9/2004 | Beckmann et al. | |
| 2005/0018651 A1* | 1/2005 | Yan et al. | 370/352 |
| 2005/0021603 A1 | 1/2005 | Yokomitsu et al. | |
| 2005/0027875 A1 | 2/2005 | Deng | |
| 2005/0068980 A1 | 3/2005 | Mathew et al. | |
| 2005/0198383 A1 | 9/2005 | Rose et al. | |
| 2006/0036765 A1 | 2/2006 | Weyman | |
| 2006/0059495 A1 | 3/2006 | Spector | |
| 2006/0095969 A1* | 5/2006 | Portolani et al. | 726/23 |
| 2006/0129698 A1 | 6/2006 | Rodriguez-Val et al. | |
| 2006/0190587 A1 | 8/2006 | Sylvest et al. | |
| 2006/0209822 A1* | 9/2006 | Hamamoto et al. | 370/389 |
| 2007/0136463 A1 | 6/2007 | Guenther et al. | |
| 2007/0162457 A1 | 7/2007 | Barcia et al. | |
| 2007/0214256 A1 | 9/2007 | Castaneda et al. | |
| 2007/0226295 A1 | 9/2007 | Haruna et al. | |
| 2007/0250565 A1* | 10/2007 | Minow | 709/203 |
| 2007/0268829 A1 | 11/2007 | Corwin et al. | |
| 2007/0288613 A1 | 12/2007 | Sudame et al. | |
| 2007/0294416 A1 | 12/2007 | Agre et al. | |
| 2007/0297430 A1 | 12/2007 | Nykanen et al. | |
| 2008/0005310 A1 | 1/2008 | Xu et al. | |
| 2008/0037534 A1 | 2/2008 | Shina | |
| 2008/0052395 A1 | 2/2008 | Wright et al. | |
| 2008/0057992 A1 | 3/2008 | Griffin | |
| 2008/0098088 A1 | 4/2008 | Tamano et al. | |
| 2008/0120512 A1 | 5/2008 | Wang | |
| 2008/0168181 A1 | 7/2008 | Berkvens et al. | |
| 2008/0198850 A1 | 8/2008 | Cooper et al. | |
| 2008/0209035 A1 | 8/2008 | Barranco et al. | |
| 2008/0209068 A1 | 8/2008 | Herzog et al. | |

(56) References Cited

U.S. PATENT DOCUMENTS

| | | | |
|---|---|---|---|
| 2008/0225865 | A1 | 9/2008 | Herzog |
| 2008/0233922 | A1 | 9/2008 | Lesrel |
| 2008/0244260 | A1 | 10/2008 | Feldman et al. |
| 2008/0313255 | A1 | 12/2008 | Geltner et al. |
| 2009/0034496 | A1 | 2/2009 | Ko et al. |
| 2009/0042574 | A1 | 2/2009 | Jung et al. |
| 2009/0059922 | A1 | 3/2009 | Appelman et al. |
| 2009/0061825 | A1 | 3/2009 | Neelakantan et al. |
| 2009/0254517 | A1 | 10/2009 | Dalton |
| 2010/0189103 | A1* | 7/2010 | Bachmann et al. ............ 370/389 |
| 2010/0205260 | A1 | 8/2010 | Daskalopoulos et al. |
| 2011/0011024 | A1 | 1/2011 | Pellicer |
| 2012/0203909 | A1 | 8/2012 | Kavanaugh et al. |

FOREIGN PATENT DOCUMENTS

| | | |
|---|---|---|
| CN | 101552848 | 10/2009 |
| EP | 1 096 739 | 5/2001 |
| EP | 1 229 442 | 8/2002 |
| EP | 1 619 868 | 1/2006 |
| GB | 2 443 501 | 7/2008 |
| WO | WO 02/096128 | 11/2002 |
| WO | WO 03/103199 | 12/2003 |
| WO | WO 2004/006603 | 1/2004 |
| WO | WO 2004/034715 | 4/2004 |
| WO | WO 2005/017707 | 2/2005 |
| WO | WO 2005/018204 | 2/2005 |
| WO | WO 2005/081499 | 9/2005 |
| WO | WO 2006/012612 | 2/2006 |
| WO | WO 2007/012534 | 2/2007 |
| WO | WO 2007/107628 | 9/2007 |
| WO | WO 2007/123359 | 11/2007 |
| WO | WO 2007/125434 | 11/2007 |
| WO | WO 2008/053030 | 5/2008 |
| WO | WO 2008/139033 | 11/2008 |
| WO | WO 2009/127254 | 10/2009 |
| WO | WO 2010/054471 | 5/2010 |
| WO | WO 2010/091506 | 8/2010 |
| WO | WO 2011/054079 | 5/2011 |
| WO | WO 2012/106820 | 8/2012 |

OTHER PUBLICATIONS

R. Braden, "Requirements for Internet Hosts—Application and Support," Internet Engineering Task Force, Oct. 1989, 97 pages.

Y. Rekhter et al., "Address Allocation for Private Internets, Internet Engineering Task Force," Feb. 1996, 9 pages.

R. Droms, "Dynamic Host Configuration Protocol," Standards Track, Mar. 1997, 43 pages.

P. Srisuresh et al., "IP Network Address Translator (NAT) Terminology and Considerations," Internet Engineering Task Force, Aug. 1999, 30 pages.

P. Srisuresh et al., "Traditional IP Network Address Translator (Traditional NAT)," Internet Engineering Task Force, Jan. 2001, 15 pages.

J. Rosenberg et al., "Session Traversal Utilities for NAT (STUN)," Internet Engineering Task Force, Oct. 2008, 51 pages.

G. Tsirtsis et al., "Network Address Translation—Protocol Translation (NAT-PT)," Internet Engineering Task Force, Feb. 2000, 20 pages.

S. Chan et al., "Devices Profile for Web Services," Microsoft Corp., Feb. 2006, 39 pages.

S. Cheshire et al., "NAT Port Mapping Protocol (NAT-PMP)," Apr. 16, 2008, 28 pages.

E. Guttman, Zeroconf Host Profile Applicability Statement, Sun Microsystems, Jul. 20, 2001, 10 pages.

CT3, "Reply LS on direct stage 3 work for NIMTC functionality," 3rd Generation Partnership Project, TSG SA Meeting #50 SP-100664, Dec. 13-15, 2010, 2 pages.

M. Karir et al., "PE-ARP: Port Enhanced ARP for IPv4 Address," Merit Network Inc., 7 pages.

B. Landfeldt et al., "Providing Scalable and Deployable Addressing in Third Generation Cellular Networks," University of Aydney, Australia, 15 pages.

Huawei, "A solution for Group Based Addressing," 3rd Generation Partnership Project, Meeting #79 TD S2-102271, May 10-14, 2010, 4 pages.

Samsung, "SIP URIs for devices without MSISDN," 3rd Generation Partnership Project, Meeting #79 TD S2-102425, May 10-14, 2010, 4 pages.

Huawei, MTC Cerver communicate with MTC Devices without exclusive MSISDN via SMS, Meeting #79 TD S2-102270, May 10-14, 2010, 3 pages.

3GPP, "Technical Specification Group Core Network and Terminals," 3rd Generation Partnership Project, 2009, (Release 9), 26 pages.

3GPP, "Technical Specification Group Services and System Aspects," 3rd Generation Partnership Project, 2011, (Release 11), 23 pages.

3GPP, "Technical Specification Group Services and System Aspects," 3rd Generation Partnership Project, 2009, (Release 10), 75 pages.

Bernard, T., "NAT Port Mapping Protocol (NAT-PMP)", MiniUPnP Project, http://miniupnp.free.fr/, date unknown.

Du, Lin, "Intelligent Cellular Network Load Balancing Using a Cooperative Negotiation Approach", IEEE Wireless Communications and Networking (WCNC 2003), New Orleans, Mar. 16-20, 2003, vol. 3, pp. 1675-1679.

Eronen, P., "TCP Wake-Up: Reducing Keep-Alive Traffic in Mobile IPv4 and IPsec Nat Traversal", Nokia Research Center, Jan. 31, 2008.

Goland et al., "Simple Service Discovery Protocol", Internet Engineering Task Force, Internet Draft, Oct. 28, 1999.

Schlimmer, J., "A Technical Introduction to the Devices Profile for Web Services", Microsoft Corporation, Web Services Technical Articles, May, 2004.

URL "Universal Plug and Play", Wikipedia entry, http://en.wikipedia.org/w/index.php? title=Universal Plug and Play &oldid=251385724, Nov. 12, 2008.

URL "What is Port Triggering?", http://www.portforward.com/help/porttriggering.htm, author unknown, date unknown.

"WAP Push Architerctural Overview", Version Jul. 3, 2001, Published 2001 by Wireless Application Protocol Forum, Ltd.

* cited by examiner

METHOD AND APPARATUS FOR NETWORK PORT AND NETWORK ADDRESS TRANSLATION

RELATED APPLICATIONS AND INCORPORATION BY REFERENCE

This application is a continuation-in-part application of international patent application Serial No. PCT/CA2009/001622 filed 17 Nov. 2009, which published as PCT Publication No. WO 2010/054471 on 20 May 2010, which claims benefit of U.S. provisional patent application Ser. No. 61/115,412 filed 17 Nov. 2008.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention pertains in general to data transfer systems and in particular to multi-computer data transfer systems.

BACKGROUND

Many multi-computer data transfer systems used today employ packet-switched networks and use communications protocols included in the Internet Protocol (IP) suite. Particulars of definitions of a number of communication protocols are controlled by the Internet Engineering Task Force (IETF) in a series of Request for Comments (RFC) documents. For example, aspects of the Internet protocol suite are defined in RFC 1122 and RFC 1123.

The protocols most used on the Internet today include the Transmission Control Protocol (TCP) and the User Datagram Protocol (UDP) which, while a number of alternatives exist, are widely carried via the IP suite. TCP provides a number of functions not provided by UDP. For example, TCP can be used to ensure that data packets are submitted by a source node at a rate supported by the intermediate network and destination network node, or that data packets can be transmitted to a destination node and reassembled in an intended sequence. UDP does not provide the sequencing or flow control of TCP. To identify network nodes, IP uses IP addresses. IP version 4 (IPv4) encodes network addresses in 32 bit long binary numbers providing approximately four billion addresses.

Due to demand for connectivity, previously isolated networks have merged into interconnected networks, for example, the integration of mobile phone networks into the Internet, having greatly enlarged total numbers of network devices and demand to distinguish among them. The limited address space provided by IPv4 and the allotment of predetermined numbers of IPv4 addresses to network operators by regulating authorities, have forced solutions to circumvent limitations due to exhaustion of IPv4 address space.

One solution is to transition the Internet to IP version 6 (IPv6), which provides a vastly increased 128 bit address space. However, in order to provide its benefits network wide, virtually all network infrastructure is required to support IPv6. To date, not all network infrastructure supports IPv6, and upgrades from IPv4 to IPv6 are still ongoing. Adoption of IPv6 can be costly, has been slow and IPv6 does not provide an imminent solution to the IPv4 address space dilemma.

Another solution is based on Network Address Translation (NAT). NAT employs translation of network addresses of data packets when they transition a NAT device that connects one part of a network with another part of a network. NAT may receive and retransmit data packets after translating or mapping a source or destination network address thereof. NAT can map one or more network addresses belonging to a first set of network addresses into a single IP address belonging to a second set of network addresses, so that outbound data packets exiting the NAT device have the same source address as the NAT device. NAT further uses rules stored in translation tables to reverse map destination addresses of inbound data packets back into the first set of network addresses. Rules are typically generated in response to outbound data packets and only used for a certain time for reverse mapping of inbound data packets. The time-limited nature of these rules may limit usefulness of existing NAT implementations. NAT is typically used to connect network nodes that have private IP addresses to a network using public IP addresses. Private and public IP addresses are defined in RFC 1918. NAT is described in a number of documents, for example, RFC 2663 and RFC 3022.

Extensions have been developed that recoup interconnectivity functions lost due to NAT but which are otherwise available in many NAT-free network connections. These extensions typically concern connecting small numbers of network nodes to the Internet. Further extensions have been developed in an attempt to enable NAT to connect networks that allow large numbers of network nodes with private IP addresses to connect to the Internet and provide a minimum of interconnectivity functions for them. Known extensions are described in U.S. Pat. Nos. 7,139,828 and 7,362,760. Further documentation referring to or describing various aspects of NAT include the Internet Gateway Device (IGD), Simple Service Discovery Protocol (SSDP), Universal Plug and Play (UPnP), Devices Profile for Web Services (DPWS), NAT-Port Mapping Protocol (NAT-PMP), Zero Configuration Networking (Zeroconf) and Jini™, for example. Existing forms of NAT, however, can be complex, cumbersome and error-prone, and extensions typically fail to provide required scalability or even rudimentary security features.

In addition, current port forwarding methods typically have several limitations. Firstly, address scalability is typically poor because a port forward rule takes away the ability of the NAT to use the port for all IP Source (SRC) addresses. This only allows 65K routable paths per available IPv4 address assuming all the port numbers are used but typically only a small fraction of the port numbers are used because the terminals all want to listen to the same ports. Secondly, port scalability is also typically poor, because the automatic methods used to set up a port forwarding rule require the terminal to request the incoming port and if that port is already used by another terminal, the request is rejected. The terminal could then try another port. If the NAT was busy, this trial and error approach could be long and inefficient. Thirdly, routing security is typically poor as the NAT will route all traffic from any server to the terminal thus creating a possible security risk. Even if narrow port forwarding is used (where only specific IP SRC addresses are being forwarded) there is typically no trust relationship built between the server, the NAT, and the terminal. Fourthly, malware security is typically poor as automated port forwarding protocols, such as UPnP, aren't secure because any malware or flash entity can setup a port forwarding rule and once compromised, the terminal can compromise all the other devices inside the firewall.

Specific problems with limited addressability may occur when contacting a terminal in a private network from an application server that itself is outside the private network. For example, polling in machine-to-machine (M2M) applications of terminals in a mobile network operator's (MNO's) network is becoming increasingly common and is expected to increase with the added mass-M2M market. Polling of terminals in M2M applications is often dynamic and asynchronous and mobile networks typically do not provide externally routable IP addresses. Without an externally routable IP address, however, the application server outside an MNO's core network cannot directly contact a terminal within the core network via IP.

A number of solutions to this issue exist but none of them are secure, scalable, or efficient. For example, some MNOs offer routable IPv4 addresses to the terminals as an additional service. Unfortunately, the limited IPv4 address space does not scale to serve the demand for IP addresses of cellular networks. Furthermore, terminals may send keep-alive messages to prevent routes through NAT from being deactivated, which, however, is not scalable, reliable or efficient as the keep-alive messages may consume significant network resources. This option is also not scalable because the network would quickly become overloaded with keep-alive messages if many terminals employed this approach. This option is also not efficient because many M2M terminals send very little data and thus the amount of keep-alive traffic can be higher than the amount of real data sent, and it is not reliable because the length of time a NAT will keep a route open can be dynamic thus periodic transmission of keep-alive messages may not always keep the route open.

In a further solution, a route to a desired terminal in a private network may be established or reactivated by sending a text message from outside to the terminal so that the terminal may seek proper action to activate the route, which however, causes communication delays and requires the terminal to be addressable by a mobile subscriber integrated services digital network number (MSISDN) which in turn requires special configuration and additional interconnections for the server, which is not cost effective given the expense associated with sending text messages.

Therefore there is a need for a solution that at least overcomes one of the deficiencies of the known art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for network port and network address translation. In accordance with an aspect of the present invention, there is provided a method for forwarding data between a first network and a second network, the first network and the second network being operatively connected, the method comprising: receiving, a first data packet from the first network, the first data packet may comprise, a first source address, a first destination address, a first source port number and a first destination port number; reconfiguring, if the first destination address is associated with the second network, the first data packet into one or more second data packets, each second data packet may comprise, a second source address, a second destination address, a second source port number and a second destination port number; the reconfiguring comprising mapping, in accordance with a data-forwarding rule (DFR), the first source address to the second source address, the first source port number to the second source port number, and the first destination port number to the second destination port number; and forwarding the one or more second data packets to the second network.

In accordance with another aspect of the present invention, there is provided an apparatus for forwarding data between a first network and a second network, the apparatus for operatively connecting the first and the second network, the apparatus comprising: a first network interface operatively connected to the first network for receiving one or more first data packets from the first network, each of the first data packets may comprise, a first source address, a first destination address, a first source port number and a first destination port number; a packet-processing system operatively connected to the first network interface for receiving the one or more first data packets, the packet-processing system configured to process the one or more first data packets and to reconfigure each of the first data packets, if the first destination address is associated with the second network, into one or more second data packets, each of the second data packets may comprise a second source address, a second destination address, a second source port number and a second destination port number, the packet-processing system mapping, in accordance with a data-forwarding rule (DFR), the first source address with the second source address, the first source port number with the second source port number and the first destination port number with the second destination port number; and a second network interface operatively connected to the packet-processing system for receiving the one or more second data packets and the second network interface operatively connected to the second network for sending the one or more second data packets to the second network.

In accordance with another aspect of the present invention, there is provided a computer program product which may comprise a memory having embodied thereon statements and instructions for execution by a computer, thereby causing the computer to perform a method for forwarding data packets between a first network and a second network, the method may comprise the steps of: receiving a first data packet from the first network, the first data packet comprising a first source address, a first destination address, a first source port number and a first destination port number; reconfiguring, if the first destination address is associated with the second network, the first data packet into one or more second data packets, each second data packet may comprise a second source address, a second destination address, a second source port number and a second destination port number; the reconfiguring comprising mapping, in accordance with a data-forwarding rule (DFR), the first source address to the second source address, the first source port number to the second source port number, and the first destination port number to the second destination port number; and forwarding the one or more second data packets to the second network.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE FIGURES

The following detailed description, given by way of example, but not intended to limit the invention solely to the specific embodiments described, may best be understood in conjunction with the accompanying drawings.

DETAILED DESCRIPTION OF THE INVENTION

Definitions

Figure 1:
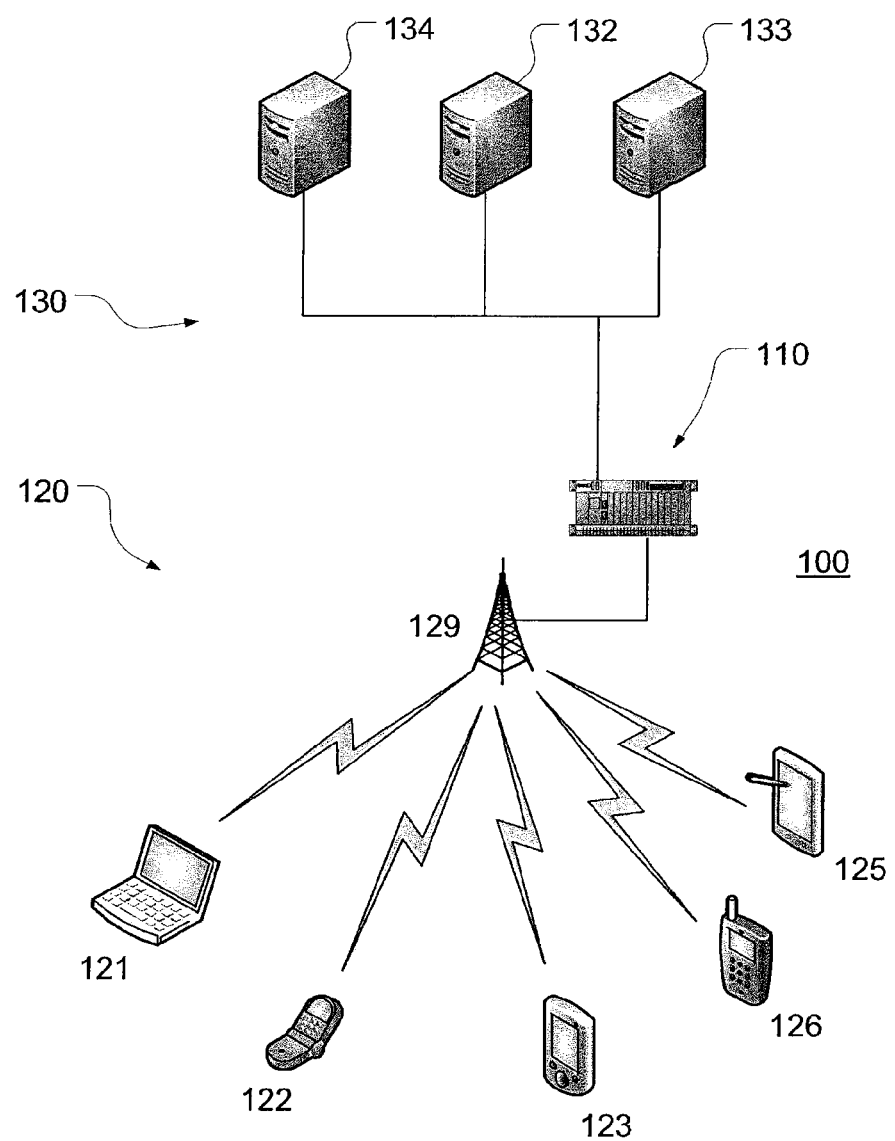
FIG. 1 illustrates a schematic network architecture diagram for employment of an embodiment of the present invention.

The term "network" can refer to an operative interconnection of data processing devices including desktop, notebook, server or super-computers, personal digital assistants (PDAs), mobile phones, smart phones, digital cameras, or other digital devices or a combination thereof by means of one or more network connection media. Network connection media may include wired or wireless interconnections, wherein network connection media can include for example, electrical transmission lines, waveguides, fiber-optic media, laser communication systems, radio wave systems, and infrared systems. Two or more networks may be interconnected, hierarchically or otherwise organized and collectively referred to as one network. Furthermore, different networks can have different network topologies.

The term "client" can refer to an application, device, terminal or automatically or user-operable system that can access a remote service on a server via a network. The application, device, terminal or automatically or user-operable system may be provided by one or more computers.

The term "server" refers to an application, device, terminal or automatically or user-operable system for providing one or more services to one or more clients. The services may be provided over one or more networks. A server may be configured to provide services in response to multiple concurrent requests via a network. The services may be provided by one or more computer programs.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for forwarding data packets between two networks. Each data packet includes an identifier and optionally a data payload. The data payload includes adequately encoded information to be conveyed by the data packet between the source and destination network nodes. The identifier comprises a source network address, destination network address, source port number and a destination port number. The method comprises receiving one or more first data packets from a first network that each includes a first source address, a first destination address, a first source port number and a first destination port number. The method further comprises reconfiguring first data packets that are destined for the second network into second data packets using a number of data-forwarding rules (DFRs). Each second data packet includes a second source address, a second destination address, a second source port number and a second destination port number.

Each data-forwarding rule defines if and how identifiers of data packets to be forwarded between two networks correlate with each other and how the identifiers are to be mapped when a data packet is reconfigured and forwarded to the other network. According to an embodiment of the present invention, a data-forwarding rule includes a first identifier associated with a first network, and a second identifier associated with a second network. Each identifier comprises two parts: a source address and source port number corresponding to a source network node, and a destination address and destination port number corresponding to a destination network node.

Data-forwarding rules according to an embodiment of the present invention may be configured to map the first source address to the second source address, the first source port number to the second source port number, and the first destination port number to the second destination port number. In some embodiments, the first source port number and the first destination port number are utilized for packet addressing within the first network, whereas the second source port number and the second destination port number are used for packet addressing within the second network, and implementation of a DFR occurs substantially on a boundary between the first network and the second network.

Data forwarding rules according to embodiments of the present invention may be reversible or invertible. For example, a DFR may be configured to map packets from the first network to the second network, and the same DFR may be configured to map packets from the second network to the first network by reversing mappings of IP addresses and port numbers.

Different first data packets can have different first source addresses, different first destination addresses, different first source port numbers and/or different first destination port numbers. Different second data packets can have different second source addresses, different second destination addresses, different second source port numbers and/or different second destination port numbers. The method further includes forwarding the one or more second data packets to a second network.

FIG. 1 illustrates an example network architecture 100 which may be configured so that at least some embodiments of the present invention may be employed in it. The illustration shows a first network 120 connected to a second network 130 via a NAT device 110. As illustrated, the first network 120 is configured as a wireless cellular network but can be configured in many other wireless or wired ways as would be readily understood. The first network 120 includes one or more wireless receiving stations 129 which can be terrestrial or satellite based. The first network can include a number of network devices, for example, as illustrated a notebook with cellular modem 121, a cellular phone 122, a smart phone 123, a PDA 126, a tablet computer or handheld device 125, or other networked digital device, as would be readily understood. Devices in the first network may use private IP addresses. The second network 130 is configured as a wired or wireless network and includes a number of servers 134, 132, and 133. The second network 130 may be part of the Internet. The servers 134, 132, and 133 may use public IP addresses. The NAT device 110 may be considered part of the first network 120 as well as part of the second network 130.

In some embodiments of the present invention, there is provided a method and apparatus for providing port scalability, address scalability, or a combination thereof. Methods and apparatus for providing port or address scalability may comprise or be provided along with methods and apparatus, respectively, for forwarding data packets, as described herein.

In some embodiments of the present invention, there is provided a method and apparatus for providing routing security, malware security, or a combination thereof. Methods and apparatus for providing routing or malware security may comprise or be provided along with methods and apparatus, respectively, for forwarding data packets, as described herein.

Method for Forwarding Data Packets

A method for forwarding data packets may be employed in an apparatus for forwarding data packets when forwarding outbound or inbound data packets originating from a network node in one network that are destined for a network node in the other network. For example, the method can be employed when forwarding data packets originating from a first network node in the first network and destined for a second network node in the second network or vice versa by a NAT device that interconnects the first network and the second network. Outbound data packets can originate from a first network node in the first network. Inbound data packets may originate from a second network node in response to data packets it received previously from a first network node, for example.

A method for forwarding data packages may be employed in an apparatus according to the present invention which may comprise a gateway, router, network address translation (NAT) device, or a gateway GPRS (general packet radio service) support node (GGSN), for example. The two networks connected by the apparatus may be wired or wireless networks, local area networks (LAN), wide area networks (WAN) or other generic, application-specific, user-specific or geography-specific networks, as would be readily understood by a person skilled in the art. The networks may be configured based on a number of interconnect systems and communication protocols. Either network may employ packet-based network protocols, for example, Internet Protocol version 4, Internet Protocol version 6 or other packet-switching network protocol as would be readily understood by a person skilled in the art.

A method according to an embodiment of the present invention can be further configured with a data-forwarding rule that further maps the first destination address to the second destination address. The method can further be configured so that the second destination address equals the first destination address. Depending on the embodiment, the method can further be configured so that the first and second source port numbers may be equal or different. The method may be configured so that first and second destination port numbers may be equal or different, independent or dependent of the source port numbers.

A method according to an embodiment of the present invention may be configured to process one or more third data packets received from the second network that each comprise a third source address, a third destination address, a third source port number and a third destination port number. According to the embodiment, each third data packet for which the third source address corresponds with the second destination address, the third destination address corresponds with the second source address, the third source port number corresponds with the second destination port number and the third destination port number corresponds with the second source port number, is reconfigured into one or more fourth data packets. The reconfiguration can take place so that each of the fourth data packets includes a fourth source address corresponding to the first destination address, a fourth destination address corresponding to the first source address, a fourth source port number corresponding to the first destination port number, and a fourth destination port number corresponding to the first source port number.

According to an embodiment of the present invention, a data-forwarding rule can be employed to map the fourth source address to the first destination address, the fourth destination address to the first source address, the fourth source port number to the first destination port number, and the fourth destination port number to the first source port number. For example, the one or more third data packets may correspond to inbound data traffic within the second network generated in response to previous outbound data traffic, and the one or more fourth data packets may correspond to inbound data traffic within the first network generated by an apparatus for forwarding data packets in accordance with a corresponding data-forwarding rule based on the one or more third data packets.

Apparatus for Forwarding Data Packets

According to an embodiment of the present invention there is provided a NAT device configured to operatively connect a first network and a second network and exchange data between the two networks. The NAT device comprises a first network interface operatively connected to the first network for receiving one or more first data packets from the first network, each of the first data packets comprising a first source address, a first destination address, a first source port number and a first destination port number. The NAT device further comprises a packet-processing system, operatively connected to the first network interface for receiving the first data packets, which is configured to process the one or more first data packets and to reconfigure each of the first data packets into one or more second data packets using one or more data-forwarding rules. Each of the second data packets comprises a second source address, a second destination address, a second source port number and a second destination port number. The data-forwarding rule correlates the first source address with the second source address, the first source port number with the second source port number, and the first destination port number with the second destination port number. The NAT device further comprises a second network interface operatively connected to the packet-processing system for receiving the second data packets and the second network interface operatively connected to the second network for sending the second data packets to the second network.

According to an embodiment of the present invention, the NAT device is configured to receive third data packets comprising a third destination address, a third source port number and a third destination port number via the second network interface from the second network. According to the embodiment, the packet-processing system is further operatively connected to the second network interface for receiving the third data packets. The packet-processing system can be further configured to process the one or more third data packets and to reconfigure each of the third data packets into one or more fourth data packets using a second data-forwarding rule so that each of the fourth data packets comprises a fourth destination address, a fourth source port number and a fourth destination port number. According to the embodiment, the first network interface is further operatively connected to the packet-processing system for receiving the fourth data packets and to the first network for sending the fourth data packets to the first network.

Figure 2:
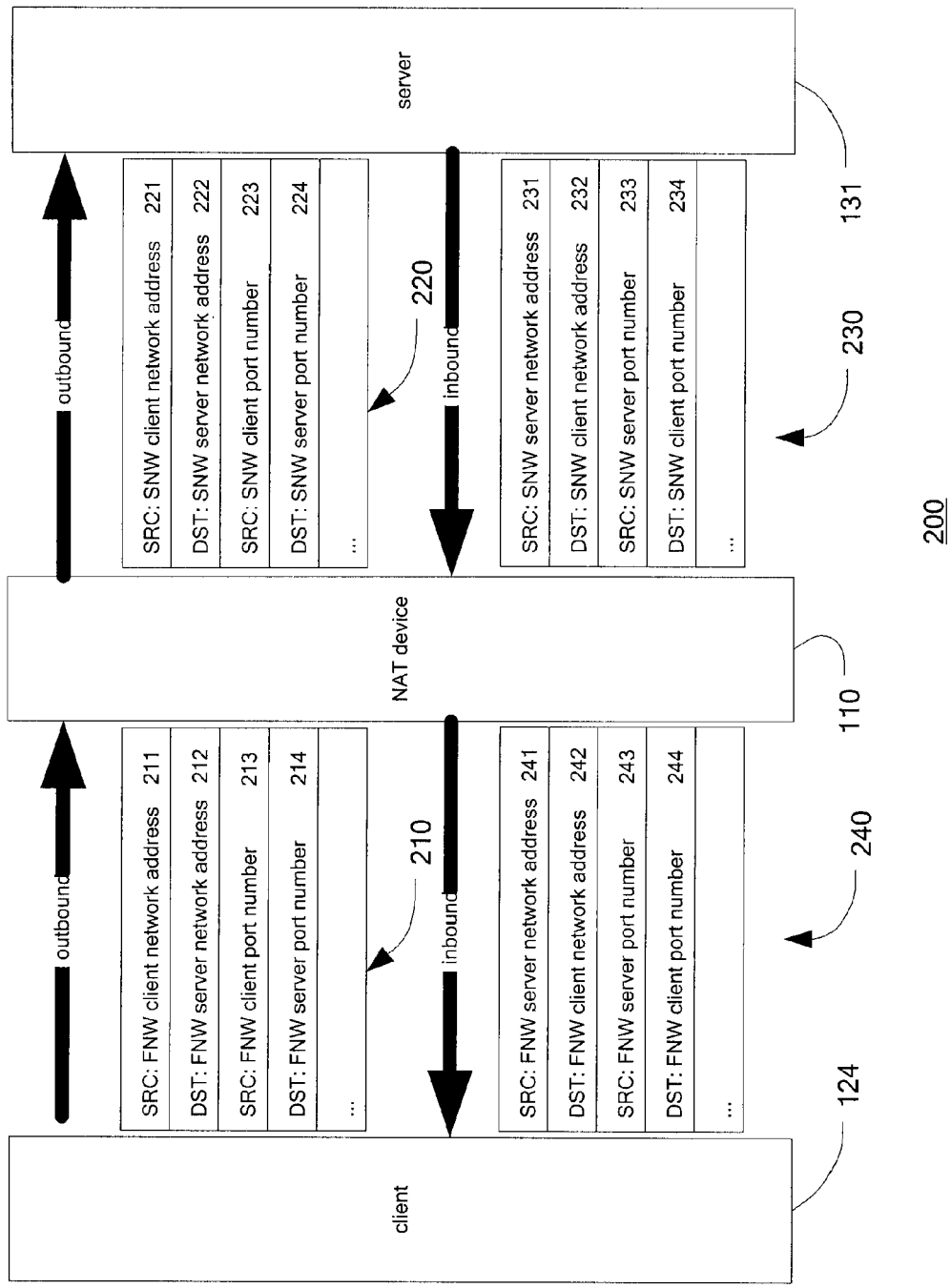
FIG. 2 illustrates a general sequence diagram of the data flow between a client, a network address translation device and a server according to an embodiment of the present invention.

FIG. 2 illustrates a sequence diagram 200 of data packet flow between client 124, NAT device 110 and server 131 according to an embodiment of the present invention. Indicated are only the identifiers of respective data packets 210, 220, 230, and 240 and an example of how they may be transformed by the NAT device 110 according to an embodiment of the present invention. It is noted that the elements of an identifier within a data packet are not required to be arranged in a contiguous fashion as illustrated but may be dispersed across a number of locations within a data packet. It is further noted that FIG. 2 illustrates the data flow between client 124, NAT device 110 and server 131 as an example for the data flow between clients and servers as mediated by a NAT device according to the present invention in general.

As illustrated, an outbound data packet 210 within the first network originating from client 124 (source) destined for server 131 (destination), having a source address being a FNW (first network) client network address 211, a destination address being FNW destination network address 212, a source port number being a FNW client port number 213, and a destination port number being a FNW server port number 214, is forwarded to the second network as one or more data packets 220. Each data packet 220 has a source address being a SNW (second network) client network address 221, a destination address being a SNW destination network address 222, a source port number being a SNW client port number 223, and a destination port number being a SNW server port number 224.

According to one embodiment of the present invention, the forwarding occurs if NAT 110 was previously configured with a corresponding data-forwarding rule. According to another embodiment, the NAT may be configured to forward the data packet even if a corresponding data-forwarding rule was not previously activated. For example, the NAT may be configured to activate a corresponding data-forwarding rule in response to receipt of an outbound packet. The data-forwarding rule may be pre-configured or configured in response to receipt of the outbound packet. According to another embodiment of the present invention, one or more data-forwarding rules may be activated automatically by NAT device 110 for client 124, only after NAT device 110 has established a predetermined trust relationship with client 124.

FIG. 2 further illustrates how an inbound data packet 230 originating from server 131 is transformed by NAT 110 into data packet 240 and forwarded to client 124. According to an embodiment of the present invention, inbound packet 240 is only forwarded if a corresponding data-forwarding rule has been previously activated in NAT device 110. An inbound data packet 230 within the second network originating from server 131 (source) destined for client 124 (destination), having, a source address being a SNW client network address 231, a destination address being a SNW destination network address 232, a source port number being a SNW client port number 233, and a destination port number being a SNW server port number 234, is forwarded to the first network as one or more data packets 240, each having a source address being a FNW client network address 241, a destination address being a FNW destination network address 242, a source port number being a FNW client port number 243, and a destination port number being a FNW server port number 244.

Certain aspects of communications among or between network nodes and an apparatus according to the present invention to facilitate employment of the present invention in packet-switched networks are described below. Corresponding communication protocols according to some embodiments of the present invention may require handshaking between network nodes or between a network node and an apparatus. Communications among or between network nodes and a NAT device may be implemented using TCP or UDP and so forth, or higher level protocols such as UPnP or other protocols known in the art, for example.

Figure 3:
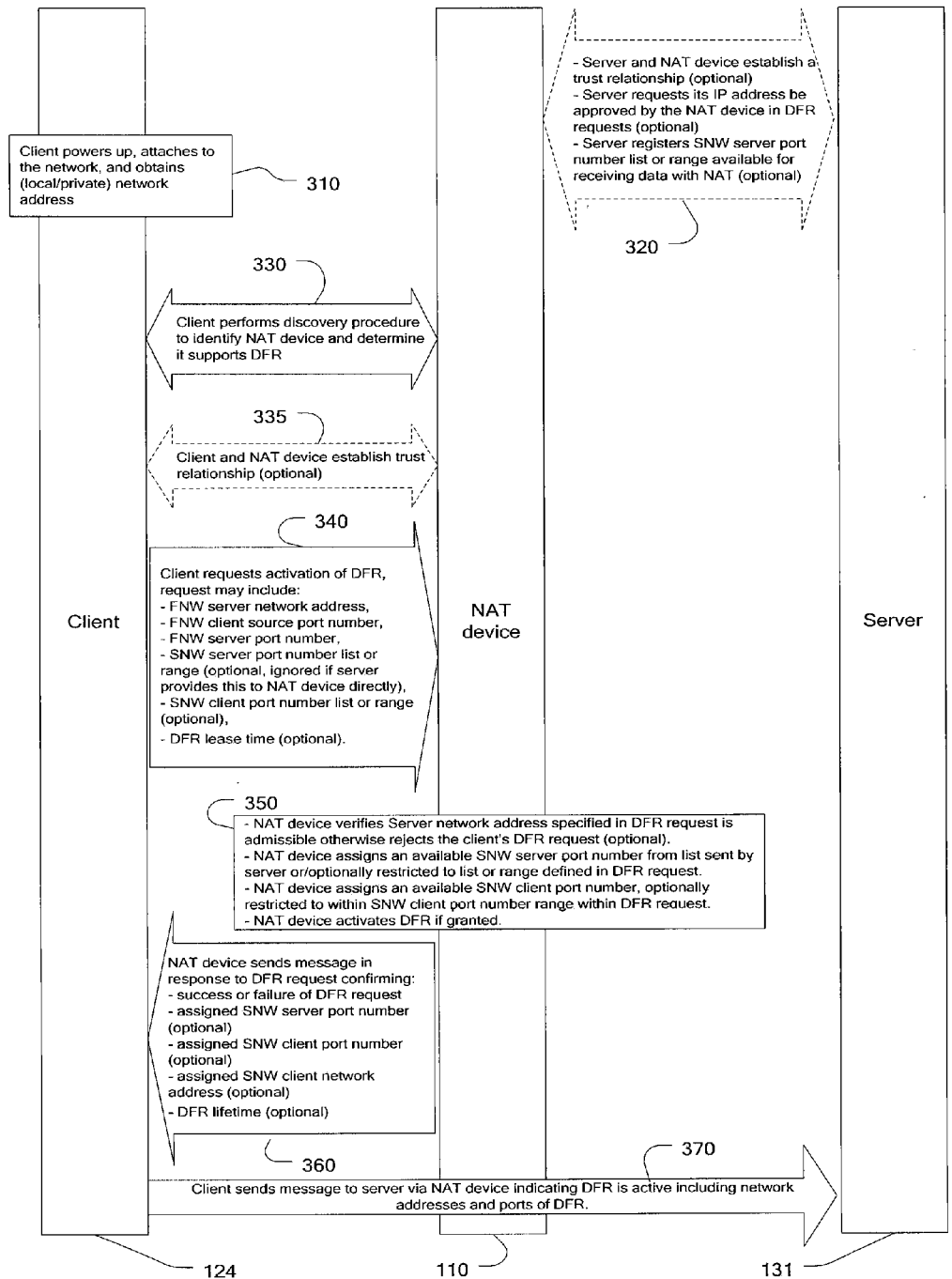
FIG. 3 illustrates a sequence diagram including example functions of communication protocols according to a number of embodiments of the present invention.

FIG. 3 illustrates a sequence diagram including various communications and procedures providing example functions performed by communication protocols between a client 124, a NAT device 110, and a server 131, according to a number of embodiments of the present invention. Again, as with FIG. 2, it is further noted that FIG. 3 illustrates the functions performed between client 124, NAT device 110 and server 131 as an example for the data flow between clients and servers as mediated by a NAT device according to the present invention in general. Communications that are optional and which may be performed depending on which embodiments are employed are indicated by dashed outlines in FIG. 3 for example communications 320 and 335. Other communications or procedures are indicated by solid outlines irrespective of whether employment of one or more of their components depends on a specific embodiment.

As illustrated in FIG. 3, various communications may occur during client initialization 310 when client 124 is activated, which may include assignment of a network address and activation of client 124 with that network address and thereby registering client 124 with the first network. Client 124 subsequently performs a discovery procedure 330 during which client 124 determines if a NAT device is present and what degree of functionality according to embodiments of the present invention NAT device 110 provides. Depending on the degree of functionality provided by NAT device 110 and client 124, client 124 and NAT device 110 may establish a trust relationship as illustrated in communication 335. A number of methods and protocols for establishing a trust relationship known in the art may be employed in embodiment of the present invention.

According to an embodiment of the present invention, communication 320 may occur independently from communications between client 124 or other clients in the first network and NAT device 110, server 131 may be configured to establish a trust relationship between server 131 and NAT device 110 if both are adequately configured. According to another embodiment, upon establishing a trust relationship, server 131 may request release of its network address and its addition to an approved server network address list with NAT device 110. According to another embodiment of the present invention, server 131 may register port numbers for the NAT device 110 to assign, such that the server 131 will accept incoming data packets from such port numbers for processing. For example, the server 131 may register a pool of port numbers, associated with the server, with the NAT device 110. Similarly, the server 131 may also register a pool of server addresses with the NAT device 110, if the server is associated with more than one IP address. According to an embodiment of the present invention, one or more of the described communications between server 131 and NAT device 110 may be performed substantially at any time.

Details of communications regarding activation of a data-forwarding rule 340, processes 350 performed by NAT device 110 in response to DFR requests, and communications 360 between NAT device 110 and client 124 in response to DFR according to one or more embodiments of the present invention illustrated in FIG. 3 are described in detail below. According to an embodiment of the present invention, once a DFR has been established, client 124 establishes a communication 370 with server 131 providing detailed information about the activated DFR and that server 131 may submit data packets to client 124 as indicated in the message.

The apparatus of the present invention may be a specialized device or a modified NAT device, routing device, firewall device, gateway, server, or the like. The apparatus may comprise one or more network interfaces operatively coupled to one or more processors, as well as memory, software, firmware, a power source, other hardware, and/or the like, configured together to implement DFRs or like operations in accordance with the present invention.

Figure 4:
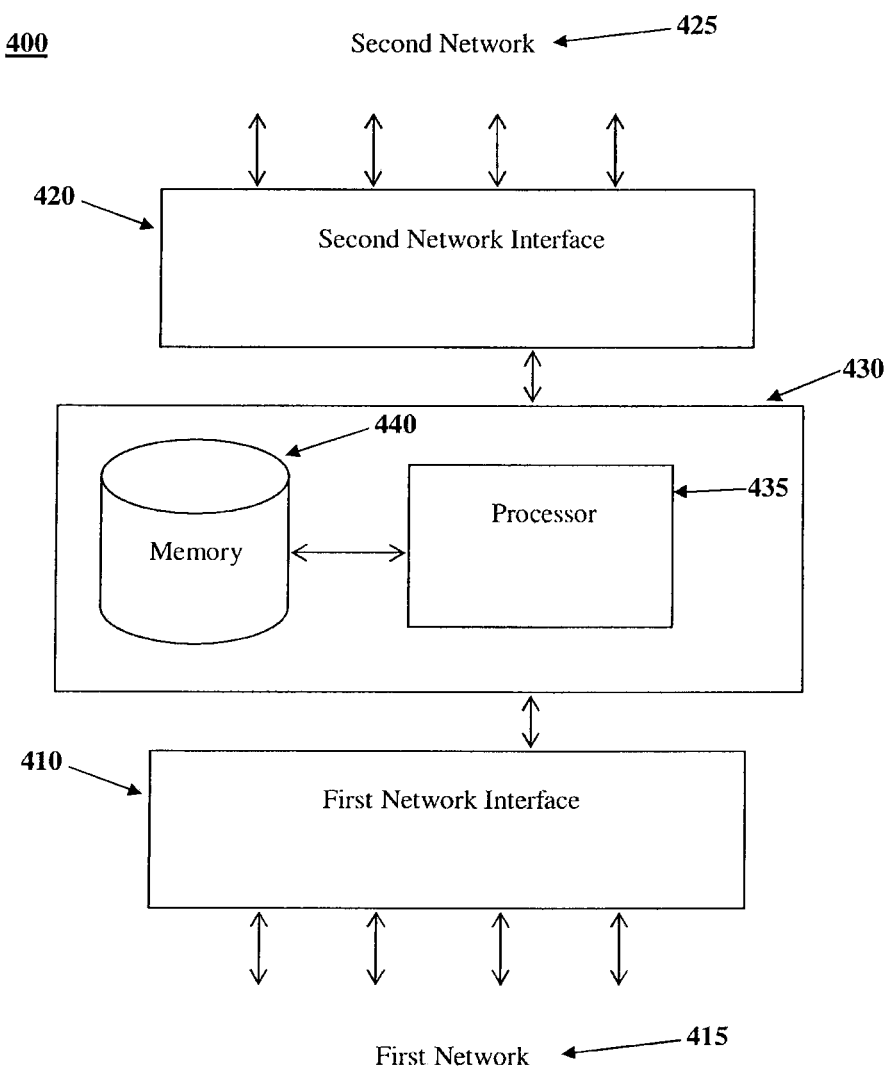
FIG. 4 illustrates an apparatus in accordance with an embodiment of the present invention.

FIG. 4 illustrates an apparatus 400 for forwarding data between a first network and a second network in accordance with an embodiment of the present invention. The apparatus 400 comprises a first network interface 410 operatively coupled to a first network 415. The first network interface 410 may comprise plural physical interfaces for facilitating concurrent connection to plural devices of the first network 415, such as mobiles or terminals, and for reception of data therefrom, and also optionally for transmission of data thereto. Data may include both data packets and control packets, for example. The physical connection may be a wired, optical, wireless, or other connection. Information exchange may proceed in accordance with one or more appropriate communication standards, such as standards of one or more OSI layers, as would be readily understood by a worker skilled in the art. The first network interface 410 may further comprise memory, such as one or more FIFO or priority queues, as well as interface control hardware, software, and/or firmware for facilitating operation of the first network interface 410. The first network interface 410 is configured to receive first data packets from the first network.

The apparatus 400 also comprises a second network interface 420 operatively coupled to a second network 425. The second network interface 420 may comprise plural physical interfaces for facilitating concurrent connection to plural devices of the second network 425, such as servers, and for transmission of data thereto, and optionally also for reception of data therefrom. Data may include both data packets and control packets, for example. The physical connection may be a wired, optical, wireless, or other connection. Information exchange may proceed in accordance with one or more appropriate communication standards, such as standards of one or more OSI layers, as would be readily understood by a worker skilled in the art. The second network interface 420 may further comprise memory, such as one or more FIFO or priority queues, as well as interface control hardware, software, and/or firmware for facilitating operation of the second network interface 420. The second network interface is configured to transmit second data packets to the second network.

The apparatus 400 also comprises a packet processing system 430 operatively coupled to the first network interface 410 and the second network interface 420. The packet processing system as illustrated comprises a processor 435 such as one or more microprocessors, the processor 435 operatively coupled to memory 440 such as solid state memory. The packet processing system 430 may also comprise other components, such as one or more memory arrays (not illustrated) configured for enqueueing packets. The memory array, if present, is operatively coupled to the processor 435 which may modify packet information, such as addresses or port numbers thereof. Alternatively, equivalent electronic, optronic, or electro-optical components may be provided. Alternatively, the processor 430 may operate on packets enqueued in the first network interface 410 or second network interface 420. Memory 440 may contain DFRs and software or instructions for operating the apparatus. In some embodiments, the processor 435 may implement DFRs held in the memory 440, and may modify said DFRs as appropriate. The packet processing system 430 is configured at least to process data packets received from the first network interface 410 and to reconfigure first data packets into second data packets for transmission by the second network interface 420 as described herein in accordance with a DFR, as appropriate. The packet processing system 430 may also be configured to process data packets received from the second network interface 420, and to transmit processed data packets based thereon via the first network interface 410 as described herein, as appropriate.

Generation, Activation and Deletion of Data-Forwarding Rules

According to an embodiment of the present invention, data-forwarding rules may be predetermined, for example, an apparatus according to the present invention may be preconfigured with one or more predetermined data-forwarding rules. According to another embodiment, data-forwarding rules may be generated in response to receiving outbound data packets in a corresponding apparatus. According to another embodiment, a data-forwarding rule may be generated only in response to a request from network nodes associated with a predetermined one of the first or the second network.

A data-forwarding rule may be generated upon receipt of a corresponding request message. The request message can be encoded in one or more data packets. With further reference to FIG. 3, predetermined communications and procedures 340, 350, and 360 may be performed in some embodiments of the present invention. According to an embodiment of the present invention, a data-forwarding rule may be activated only in response to a request from one or more predetermined network nodes, for example, if the source and/or destination network address are included in a list of approved network addresses, such as a whitelist, and/or not included in a list of disapproved network addresses, such as a blacklist.

According to an embodiment of the present invention, communications 340 between client 124 and NAT device 110 may take place as illustrated during submission of a DFR request from client 124 to NAT device 131. According to an embodiment of the present invention, a DFR request includes a FNW server network address indicating a server such as server 131 with which client 124 wants to establish a communication channel open for inbound data packets from the server, a FNW client port number indicating the port at which client 124 expects to receive data packets from server 131, and a FNW server port number indicating from which server port the message is to originate from. According to an embodiment of the present invention, communication 340 is configured (by exclusion of a FNW client network address) and NAT device 110 is configured to grant DFR requests for client 124 only if the request originates from client 124. According to another embodiment, communication 340 can optionally include a FNW client network address and NAT device 110 can be configured to grant activation requests for a DFR for one client even if the DFR request was received from another client.

According to a number of embodiments, a DFR request may additionally include one or more of the following: a list or range of SNW server port numbers, or a list or range of SNW client port numbers, from either or both of which NAT device 110 is to select one for activation of the DFR. Optionally, DFR requests may further include a DFR lease time indicating an expiry date and time for the DFR. Optionally, DFR requests may additionally or alternatively include one or more DFR lease expiry conditions indicating one or more event-based conditions which, if satisfied, cause the DFR to expire.

According to an embodiment of the present invention, procedure 350 can be optionally configured so that NAT device 110 verifies if a FNW/SNW server network address included in a DFR request is admissible. According to an embodiment of the present invention the FNW server network address is the same as the SNW server address. For this purpose NAT device 110 may maintain lists of approved or disapproved server network addresses as described herein. Procedure 350 and NAT device 110 can be further configured to select an available SNW server port number and optionally further select it from the list or range of SNW server port numbers included in the DFR request. Similarly, according to a further embodiment, an available SNW client port number may be optionally further selected, if possible, from the list or range of SNW client port numbers included in the DFR request. Port number selection from a set of available port numbers may be made sequentially, randomly, or the like, or by another method. Different embodiments may be configured to respond differently if a SNW server or client port number is available but not included in the corresponding list or range of SNW server or client port numbers included in the DFR request. If DFR request can be granted, NAT device 110 activates the DFR and establishes communication 360 with client 124 in response to the DFR request communication 340 as further described.

During communication 360, NAT device sends a message to client 124 confirming if the DFR request of communication 340 has been granted and the corresponding DFR has been activated. Depending on the embodiment being employed, the message can further include one or more of the SNW server port number, the SNW client port number, the SNW client network address (the network address of NAT device 110 in the second network), and the DFR lease time. According to corresponding embodiments and as described above, client 124 establishes a communication 370 with server 131 providing detailed information about the activated DFR and that server 131 may submit data packets to client 124 as indicated in the message.

One or more DFRs may be configured to be in effect until one or a combination of two or more predetermined delete events occur. Example delete events can include expiry of a predetermined lease time of a DFR, exhaustion of a predetermined number of invocations of a DFR, purging of DFRs in a predetermined manner upon exhaustion of a predetermined maximum number of DFRs have been activated, a delete request from a network node, upon detection of abuse of a data-forwarding rule, upon detection of an attack by one or more network nodes, or a restart of one or more components of a system embodying the present invention.

According to an embodiment of the present invention, data-forwarding rules may be generated or deleted collectively or one by one in response to one or more generation or delete events.

According to embodiments of the present invention, a predetermined maximum number of data-forwarding rules may be in effect. According to another embodiment of the present invention, quotas for data-forwarding rules can be in effect, for example, per network or per network node. Quota for data-forwarding rules may be uniform for all network nodes or different for different network nodes and may be determined based on a quality of service level associated with a network node.

Port Forwarding and Port Mapping

According, to an embodiment of the present invention, a first data packet received from a first network including a first identifier can be forwarded according to a data-forwarding rule also including the first identifier. During forwarding at least one second data packet is generated which is sent to the second network. Data forwarding based upon source network address and a destination port number that additionally considers a source port number can be used to discriminate inbound and outbound data packets over data forwarding that is based on the source network address and the destination port number alone. The additional consideration of the source port number in port forwarding via NAT, consequently, can be used to increase the number of distinct connections available per source address and destination port. This can help offset lack of discrimination otherwise associated with data forwarding based on IP address induced by the mapping of a plurality of private IP addresses of outbound data packets onto a single public IP address of an apparatus according to the present invention, when forwarding data packets from a private network to a public network, for example. This aspect of the present invention may be referred to as micro-port forwarding and can be employed to improve the number of possible concurrent network connections between network nodes in different packet-switched networks that are connected via an apparatus according to the present invention. Port forwarding and port mapping according to some embodiments of the present invention can also reduce a network node's vulnerability to receive unsolicited data traffic via NAT which in turn can improve resilience against undesired attacks.

According to an embodiment of the present invention one or more of the one or more identifier elements including network addresses and port numbers may change as a consequence of the application of the data-forwarding rule. An apparatus according to the present invention may consequently be provided with sufficient computational power to be able to perform address and port mapping at a predetermined rate.

According to an embodiment of the present invention, the mapping process may map one first packet to one second packet. For a number of reasons known in the art, a first packet may need to be split into two or more second packets. According to an embodiment of the present invention, when a first packet in the first network that is bound for the second network is split into more than one second packet, each second packet inherits the mapped identifier of the corresponding first packet. An apparatus according to the present invention that is configured to be able to also perform packet splitting may require further increased computational power.

Scalability Features

Embodiments of the present invention provide for methods and apparatus for providing port scalability, address scalability, or a combination thereof. For example, scalability may utilize or operate with the data forwarding rules described herein to facilitate increased availability of connections between the first network and the second network via the NAT, network boundary, or device thereof.

In some embodiments, port scalability may involve, when configuring a DFR, specifying a range or set of acceptable second network source port numbers and/or second network destination port numbers to be associated with outgoing packets sent into the second network. For example, a DFR may be configured in response to a request by a terminal of the first network, which specifies such a range or set within the request.

In some embodiments, establishing a DFR of the present invention includes specifying, by a device within the first network, one or more sets of port numbers, wherein one or both of the second source port number and second destination port number are selected from a corresponding one of said one or more sets of port numbers.

Ranges or sets may be explicitly specified by transmitting range endpoints, or implicitly specified by use of wildcards, don't care conditions or bit masking for example. The NAT or other intermediate device may select one or more unused port numbers from the range or set, thereby reducing the potential that a DFR set-up request will be rejected. In some embodiments, port scalability may reduce expected set-up time of a DFR, since the set-up request is flexible in terms of which port numbers are used in the DFR. This reduces the potential that a requested DFR will be rejected due to a requested port number already being in use, thereby reducing the expected amount of bandwidth and time resources used in establishing a DFR. Since the DFR, as described herein, may be configured to translate first port numbers to second port numbers, the terminal may be substantially indifferent to the second port numbers (incorporated into packets of the second network) actually in use. Thus, reconfiguration of port numbers according to the present invention may facilitate specifying ranges or sets of acceptable port numbers when requesting a DFR, instead of specifying only a single acceptable port number which may not be available.

In some embodiments, address scalability may involve use of the second network source port numbers as a routing dependency for incoming packets, thereby allowing routing of packets from the second network to the first network to be based on second source address, second source port number and second destination port number of incoming packets. A DFR in accordance with the present invention may also be implemented to translate addresses and port numbers as described herein.

In some embodiments, a packet received from the second network is processed in accordance with a DFR, and a processed packet based thereon is forwarded to the first network. The received packet includes a source address, destination address, source port number, and destination port number, associated with the second network. The processed packet includes at least a destination address corresponding to a destination within the first network. The DFR determines the destination address of the processed packet based at least in part on the source address, source port number and destination port number of the received packet.

In some embodiments, address scalability may facilitate allowing multiple nodes in the first network to share a port even when communicating with the same node of the second network, since the second network source or server port number may be used as a routing dependency to differentiate where to forward a packet incoming from the second network. Address scalability may also allow an increase in the number of routable addresses in the first network since the second network source port number may be used as an additional routing dependency for incoming packets, thereby increasing the number of potential unique identifiers of packets incoming from the second network, which are usable for routing and/or NAT purposes.

For example, an IPv4 packet configured for TCP or UDP includes header information specifying 32-bit source and destination addresses, and a data field containing a TCP or UDP payload. The TCP or UDP payload further comprises two 16-bit fields each specifying source and destination port numbers. The addresses and port numbers may be modified by DFRs in accordance with the present invention. A DFR may be implemented such that packets incoming from a node of the second network are forwarded to a corresponding node in the first network if: the packet's second source address matches a stored server address of the DFR, the second destination port number matches a stored destination port number of the DFR, and the second source port number matches a stored source port number of the DFR. Use of the second source and destination port numbers together as routing dependencies provides an increase in the number of possible routing paths. For example, for each server address, up to $2^{46}$ destination port numbers may be specified, and for each server address and destination port number, up to $2^{16}$ source port numbers may be specified. Therefore, for each server address, up to $2^{46} \times 2^{16} = 2^{32}$ unique identifiers may be specified, which facilitates differentiation of up to $2^{32}$ different destination nodes within the first network.

In some embodiments, the range of second source port numbers and second destination port numbers may be restricted so as to reduce computational requirements of listening to a large number of ports at the NAT, second network node, or both.

In some embodiments, since the DFR, as described herein, may be configured to translate port numbers, the second network source port number may be used as a routing dependency without requiring that the second source port number be seen by the corresponding device within the first network. Thus, the DFR according to the present invention may facilitate the above-described address scalability in some embodiments.

Security Features

Some embodiments of the present invention may employ additional steps before the activation of one or more data-forwarding rules to provide a number of security features. For example, steps may be taken during which rights may be negotiated between network nodes and an apparatus according to embodiments of the present invention that determine which data-forwarding rules may be activated when and by what network nodes. For example, limitations may be imposed on the masquerading of network addresses, the mapping of network ports, or the ability to activate data-forwarding rules. According to a number of embodiments of the present invention and as illustrated in FIG. 3 and discussed above, communication protocols are provided for communication among or between network nodes and an apparatus according to the present invention that facilitates employment of the additional steps required to provide the security features.

According to an embodiment of the present invention, mapping or masquerading restrictions may be predetermined or activated during operation in response to predetermined limit events. Mapping or masquerading restrictions or both may, once effected, expire at predetermined delete-restriction events. Limit or delete-restriction events may include one or a combination of two or more of the following examples: expiry of a predetermined life time of a data-forwarding rule, expiry of a predetermined number of invocations of a data-forwarding rule, purging upon exhaustion of a predetermined maximum number of data-forwarding rules, a delete request from a network node, upon detection of abuse of a data-forwarding rule, upon detection of an attack by one or more network nodes, or a restart of one or more components of a system embodying the present invention.

By imposing restrictions on which data-forwarding rules may be activated, forwarding of each data-packet can be controlled based upon its identifier. For example, the propagation of data-packets can be suppressed that may undesirably interfere with network operations. Such restrictions may help ward off abuse of the network.

According to an embodiment of the present invention, port mapping may be restricted to one or more port numbers. For example, the source or destination port numbers or both may be restricted to predetermined port numbers or determined during communication for discovery or registration of network services among or between network nodes and an apparatus according to the present invention. According to an embodiment, a request for activation of a data-forwarding rule may include one or more destination port numbers or ranges of destination port numbers from which one destination port number can be determined with which the data-forwarding rule can be activated. Furthermore, in packet switched networks such as IPv4 or IPv6, functions of port numbers 0-1023 are, at least in part, determined by the Internet Assigned Numbers Authority (IANA) as is readily known in the art. Therefore, in some embodiments, reserved port numbers may be avoided when specifying and/or selecting port numbers.

According to an embodiment of the present invention, network address masquerading may be restricted based upon one or more lists of network addresses or one or more lists of pairs of source and destination addresses. According to an embodiment of the present invention, a data-forwarding rule may only be activated if its source address corresponds to a network node in a predetermined one of the two interconnected networks and its destination address corresponds to a network node whose network address meets a predetermined approval criterion. In one embodiment, a predetermined approval criterion corresponds to inclusion of the network address in a list of approved network addresses, such as a whitelist. In one embodiment, a predetermined approval criterion corresponds to exclusion of the network address from a list of disapproved network addresses, such as a blacklist.

According to an embodiment of the present invention, lists of approved or disapproved network addresses may be predetermined or network addresses may be added or removed from the approved or disapproved network addresses lists based upon the outcome of steps for communication for discovery or registration of network services for establishing a trust relationship between network nodes and an apparatus according to the present invention. A number of methods and protocols for establishing trust between network nodes are known in the art and may be employed in the present invention. For example, known methods and protocols may include trust policies including exchange of security keys or security key components between participating devices, use of access control lists, temporary access restrictions, or other methods and protocols as would be readily known.

In some embodiments, incoming packets from the second network may be routed to a destination in the first network only if the second source address, and possibly one or more of the second source port number and second destination port number, of the incoming packets collectively meet predetermined approval criteria, such as appearing on a white list or not appearing on a black list.

In some embodiments, establishing and implementing a DFR may be performed without explicit participation by a first network device, a second network device, or both. For example, a DFR may automatically be set up between a terminal and a server without requiring special configuration on the part of either. This may allow the present invention to be implemented without reconfiguration of one or more associated network devices.

The invention will now be described with reference to specific examples. It will be understood that the following examples are intended to describe embodiments of the invention and are not intended to limit the invention in any way.

EXAMPLES

Example 1

Figure 5:
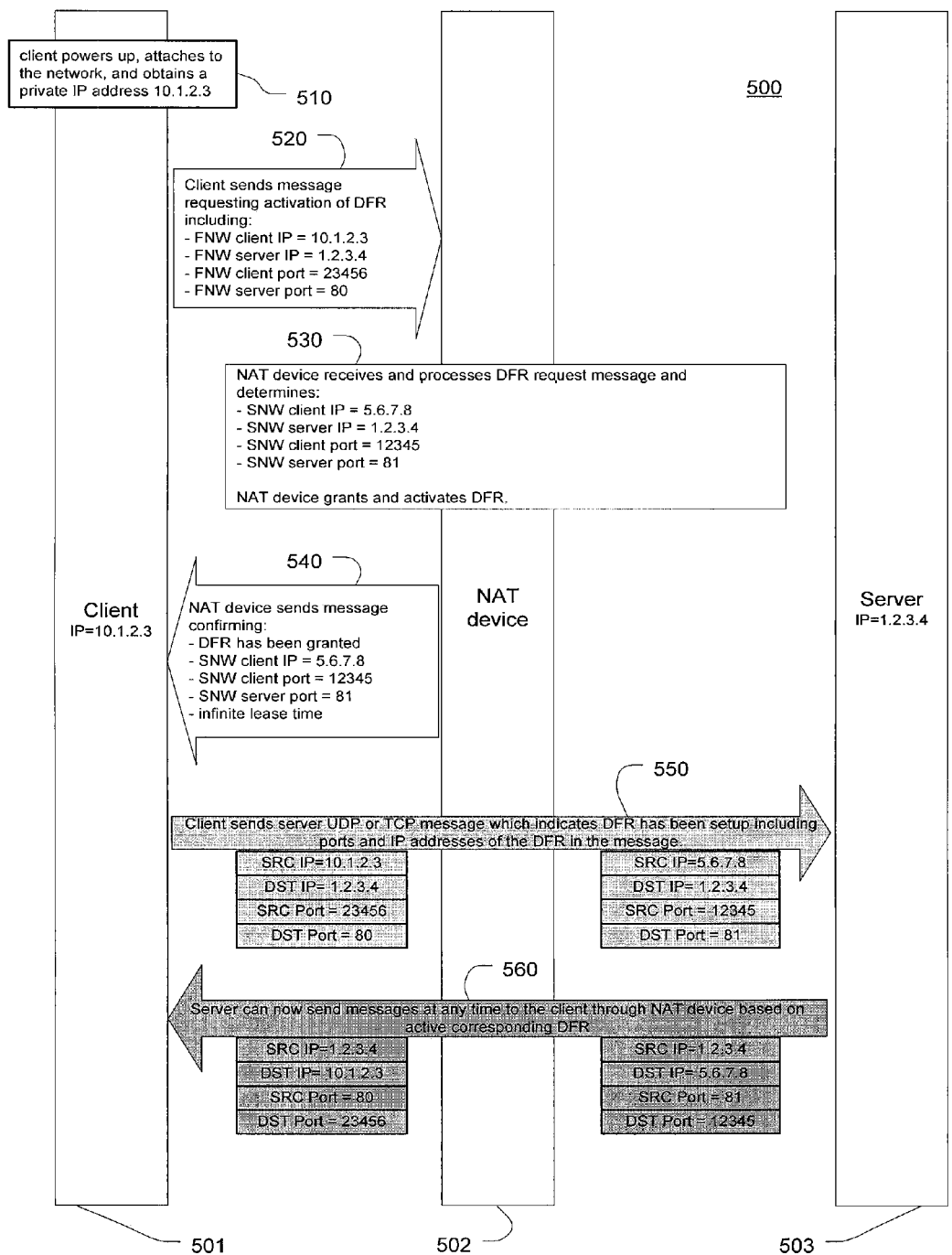
FIG. 5 illustrates a sequence diagram of an example method according to an embodiment of the present invention.

FIG. 5 illustrates a sequence diagram 500 of an example method according to an embodiment of the present invention for use in a system comprising client 501, NAT device 502, and server 503. The method includes procedure 510 during which the client is activated and attached to and registered with a first network. The client obtains IP address 10.1.2.3, for example via dynamic host control protocol (DHCP) from a DHCP server. The client IP address is part of a private IP address space assigned for communication within the first network between clients including client 501 and NAT device 502. Public IP addresses are being used for communication within the second network between servers including server 503 and NAT device 502. The DHCP server may be integrated with NAT device 502 or a different element.

Before requesting activation of a DFR, the client 501 determines a FNW server IP address, a FNW client port, and a FNW server port. The client 501 may further determine one or more of: a SNW pool of client port numbers, a SNW pool of server port numbers, and a SNW pool of server addresses. The client can perform this in a number of different ways, for example, by automatic network service discovery, by using information gathered by client 501 in response to a user request such as a web service registration on a web server, by reading non-volatile memory pre-loaded with relevant values, for example during manufacture, or the like.

In some embodiments, pools of source addresses, destination addresses, source port numbers and/or destination port numbers may define potential port numbers and/or addresses which are acceptable by the client and/or server for use in communication between client and server, when such communication is subject to packet forwarding between a first and second network in accordance with embodiments of the present invention. The client and/or server may communicate such pools for use in forwarding data, and/or the pools may be predetermined. Generation or activation of a DFR may comprise selection of source and/or destination addresses and/or source and/or destination port numbers from pools thereof. The selected address numbers and/or port numbers may be utilized in reconfiguring addresses and/or ports of packets in accordance with the DFR. For example, when reconfiguring packets from the first network into packets for the second network, a DFR may reconfigure a first destination port number into a second destination port number selected from a pool of port numbers defined by the packet originator (e.g. client) or packet receiver (e.g. server). In various embodiments, source port numbers, source addresses, and/or destination addresses reconfiguration may be similarly reconfigured in accordance with a DFR for packets forwarded in either direction between the first and second networks.

In order to activate a DFR with NAT device 502, client 501 further sends a message 520 requesting DFR activation as illustrated in FIG. 5. The message includes the FNW client IP address, the FNW server IP address, the FNW client port, and the FNW server port as determined above and specified in FIG. 5. Upon receipt of the DFR request, NAT device 502 attempts to determine at least a SNW client IP address, a SNW client port, and a SNW server port as specified in FIG. 5 in procedure 530. For this purpose NAT device 502 is configured to perform SNW port numbers and network address determination automatically. NAT device 502 can be configured to perform this in a number of different ways, for example, by selecting available SNW port numbers and network addresses from corresponding lists or ranges stored in NAT device 502 and maintaining information about the use of SNW port numbers and network addresses.

In some embodiments, the NAT may refuse a request to activate a DFR if all the combinations of SNW client IP, SNW client port, and SNW server port numbers are already in use. The number of available DFRs for each SNW client IP address and SNW server IP address combinations can be calculated by multiplying the number of available SNW client port with the number of available SNW server ports usable by the NAT. In the present example, if no restrictions on port numbers were provided by client or server, a substantial proportion of the entire 16-bit port number range may be usable, and the number of available DFRs may approach over 4 billion.

In this example, NAT device 502 determines if the DFR request is feasible. If so, NAT device 502 grants and activates the corresponding DFR. The NAT device 502 sends a confirmation message 540 to client 501 specifying that the DFR request has been granted. The information included in the response includes at least that SNW client IP=5.6.7.8, SNW client port=12345, and SNW server port=81. If not yet predetermined by the configuration of the whole system, the message may optionally include, for example, information about the lease time of the DFR which indicates for how long the DFR will be active in NAT device 502. The message may further include the FNW port numbers and network addresses of the DFR request. This may be used to avoid the need for data packet resequencing or a limitation of one pending DFR request per client at a time, for example. This may allow client 501, if properly configured, to request another DFR while response message 540 is still outstanding. Alternatively (not illustrated), NAT device 502 refuses the DFR request and notifies client 501 accordingly.

Subsequently, if the DFR has been activated, client 501 sends a message 550 indicating that a DFR has been established for direct communication between server 503 and client 501 to server 503 via NAT device 502. Server 503 can subsequently submit 560 data packets directly to client 501 that include an identifier that complies with the identifier encoded in the DFR just activated for as long as the corresponding DFR remains active. If the DFR has been rejected (not illustrated), client 501 may submit another DFR request requesting activation of the same or a different DFR. NAT device 502 may be configured to process none or up to a predetermined maximum number of DFR requests from the same client within a predetermined time from an earlier rejection.

Example 2

Figure 6:
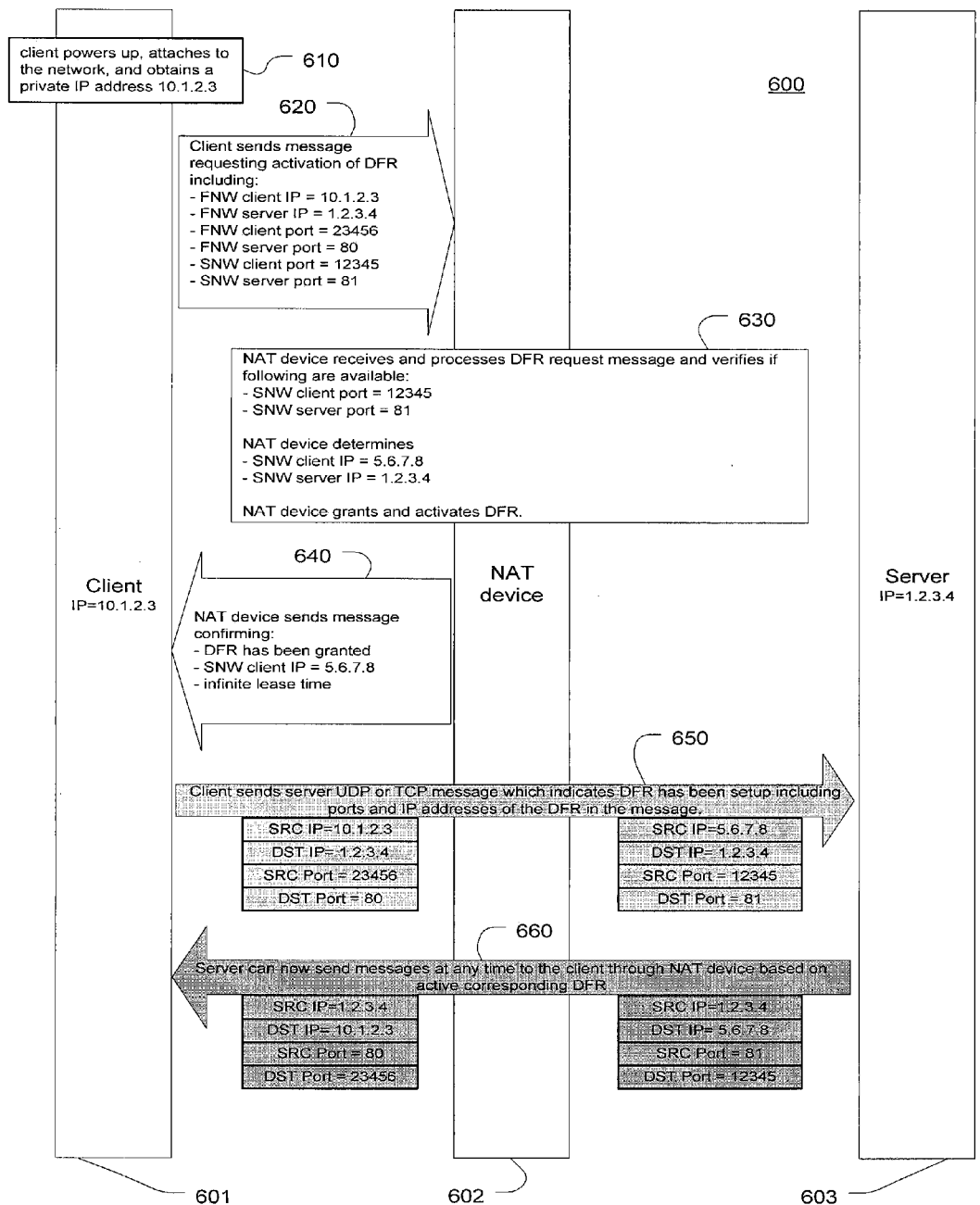
FIG. 6 illustrates a sequence diagram of an example method according to another embodiment of the present invention.

FIG. 6 illustrates a sequence diagram 600 of an example method according to another embodiment of the present invention. Example 2 differs from Example 1 generally in that DFR request messages of client 601 additionally include a SNW client port and a SNW server port, which in contrast to Example 1, are now prescribed by client 601 and no longer left to be decided or selected by NAT device 602. This requires different configurations of client 601, NAT device 602 and the communications and procedures 620, 630, and 640. Procedure 610, and communications 650 and 660 are similar to corresponding procedure 510, and communications 550 and 560.

As illustrated in FIG. 6, the example method can be used in an example system including client 601, NAT device 602, and server 603. The method includes procedure 610 during which the client is activated and attached to and registered with the network. The client obtains private IP address 10.1.2.3, for example via dynamic host control protocol (DHCP) from a DHCP server. The DHCP server may be integrated with NAT device 602 or a different element.

Before requesting activation of a DFR, client 601 determines a FNW server IP, a FNW client port, a FNW server port, a SNW client port, and a SNW server port. The client can perform this in a number of different ways, for example, by automatic network service discovery or by using information gathered by client 601 in response to a user request such as a web service registration on a web server or based on predetermined rules or policies for service client 601 seeks to establish with server 603, or a combination of these methods.

In order to activate a DFR with NAT device 602, client 601 sends a message 620 requesting DFR activation as illustrated in FIG. 6. The message includes the FNW client IP, the FNW server IP, the FNW client port, the FNW server port, the SNW client port, and a SNW server port as determined above and specified in FIG. 6. Upon receipt of the DFR request, NAT device 602 processes the DFR request.

In this example, NAT device 602 first determines if the DFR request is feasible. If so, NAT device 602 selects one (SNW client IP) of the one or more public IP addresses assigned to it, and grants and activates the corresponding DFR (not illustrated). The NAT device 602 sends a confirmation message 640 to client 601 specifying that the DFR request has been granted. The information included in the response comprises the SNW client IP. If not yet predetermined by the configuration of the system, the message may optionally include, for example, information about the lease time of the DFR which indicates how long the DFR will be active in NAT device 602. The message may further include the FNW and SNW port numbers and network addresses of the DFR request. This, as well as other solutions, may be used to avoid the need for data packet resequencing or a limitation of one pending DFR request per client at a time, for example. This may allow client 601, if properly configured, to request another DFR while response message 640 is still outstanding. Alternatively (not illustrated), NAT device 602 refuses the DFR request and notifies client 601 accordingly. Refusal may occur, for example, if the NAT 602 already has DFR rules assigned for SNW clients, such that the requested combination of SNW client and server port numbers is already in use.

Subsequently, if the DFR has been activated, client 601 sends a message 650 indicating that a DFR has been established for direct communication between server 603 and client 601, to server 603 via NAT device 602. Server 603 can subsequently communicate 660 data packets directly to client 601 that include an identifier that complies with the identifier encoded in the DFR just activated for as long as the corresponding DFR remains active. If the DFR has been rejected (not illustrated), client 601 may submit another DFR request requesting activation of the same or a different DFR. NAT device 602 may be configured to process none or up to a predetermined maximum number of DFR requests from the same client within a predetermined time from an earlier rejection.

Example 3

Figure 7:
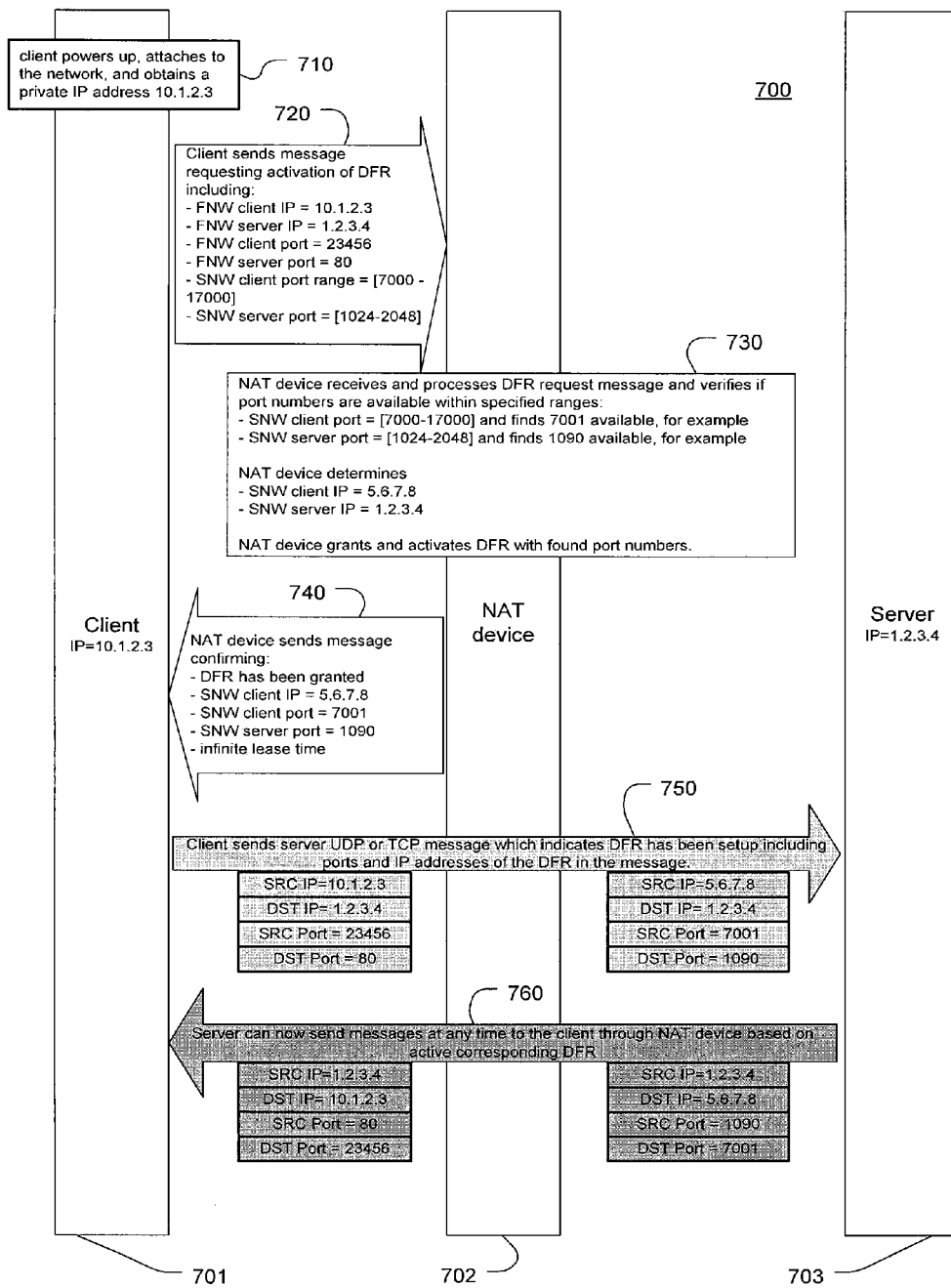
FIG. 7 illustrates a sequence diagram of an example method according to another embodiment of the present invention.

FIG. 7 illustrates a sequence diagram 700 of an example method according to another embodiment of the present invention. Example 3 differs from Example 2 generally in that DFR request messages of client 701 additionally include a SNW client port range and a SNW server port range which in contrast to Example 2 are now again left to be decided by NAT device 702 but within prescribed ranges specified in a DFR request. This embodiment requires different configurations of client 701, NAT device 702 and the communications and procedures 720, 730, and 740. Procedure 710 and communications 750 and 760 are similar to corresponding procedure 610 and communications 650 and 660.

As illustrated in FIG. 7, the example method can be used in an example system including client 701, NAT device 702, and server 703. The method includes procedure 710 during which the client is activated and attached to and registered with the network. The client obtains private IP address 10.1.2.3, for example via dynamic host control protocol (DHCP) from a DHCP server. The DHCP server may be integrated with NAT device 702 or a different element.

Before requesting activation of a DFR, client 701 determines a FNW server IP, a FNW client port, a FNW server port, a SNW client port range, and a SNW server port range. The client 701 can perform this in a number of different ways, for example, by automatic network service discovery or by using information gathered by client 701 in response to a user request such as a web service registration on a web server or based on predetermined rules or policies for a service client 701 seeks to establish with server 703.

In order to activate a DFR with NAT device 702, client 701 further sends a message 720 requesting DFR activation as illustrated in FIG. 7. The message includes the FNW client IP, the FNW server IP, the FNW client port, the FNW server port, the SNW client port range, and the SNW server port range as determined above and specified in FIG. 7. Upon receipt of the DFR request, NAT device 702 attempts to determine a SNW client IP, a SNW client port, and a SNW server port, and possibly a SNW server IP, as specified in FIG. 7 in procedure 730. For this purpose, NAT device 702 performs SNW port numbers and network address selection automatically. NAT device 702 can be configured to perform this in a number of different ways, for example, by selecting available SNW port numbers and network addresses from corresponding lists stored in NAT device 702 and maintaining information about the use of SNW port numbers and network addresses.

In this example, NAT device 702 further determines if the DFR request is feasible by determining if SNW client port and SNW server port are available in combination with the other identifier elements (for example SNW server and client network addresses) for activating the DFR. If so, NAT device 702 grants and activates the DFR. The NAT device 702 sends a confirmation message 740 to client 701 specifying that the DFR request has been granted. The information included in the response comprises the SNW client IP, SNW client port, and SNW server port. If not yet predetermined by the configuration of the system, the message may optionally include information about the lease time or other lease expiry conditions associated with the DFR, for example.

The message may further include the FNW port numbers and network addresses of the DFR request. This may be used to avoid the need for data packet resequencing or a limitation of one pending DFR request per client at a time, for example. This may allow client 701, if properly configured, to request another DFR while response messages 740 is still outstanding. Alternatively (not illustrated), NAT device 702 refuses the DFR request and notifies client 701 accordingly.

Subsequently, if the DFR has been activated, client 701 sends a message 750 indicating that a DFR has been established for direct communication between server 703 and client 701, to server 703 via NAT device 702. Server 703 can subsequently submit 760 data packets directly to client 701 that include an identifier (for example SNW server and client network addresses) that complies with the identifier encoded in the DFR just activated for as long as the corresponding DFR remains active. If the DFR has been rejected (not illustrated), client 701 may submit another DFR request requesting activation of the same or a different DFR. NAT device 702 may be configured to process none or up to a predetermined maximum number of DFR requests from the same client within a predetermined time from an earlier rejection.

Example 4

In this example system the term "terminal" can refer to a mobile terminal, terminal equipment, mobile equipment, client on a terminal, or an M2M (mobile to mobile) terminal.

The example system provides a method for a server outside a mobile network to initiate communications to a terminal via IPv4 across 3GPP™ and non-3GPP networks that is scalable and secure. The example system may be configured to require a single IPv4 packet from the server outside the core network to initiate communications to the terminal and may be also configured to provide a low latency for initiating IP communications comparable to that of initiating communication to a static routable IPv4 address under equivalent conditions. The example system may be configured to be scalable to allow the use of all the IPv4 local gateway address space ($2^{24}$) to connect to terminals and shall be scalable to allow for more than four billion connected terminals through one IPv6 gateway. The example system may be configured to provide a reduced risk for terminals to receive unsolicited or unwanted traffic.

Figure 8:
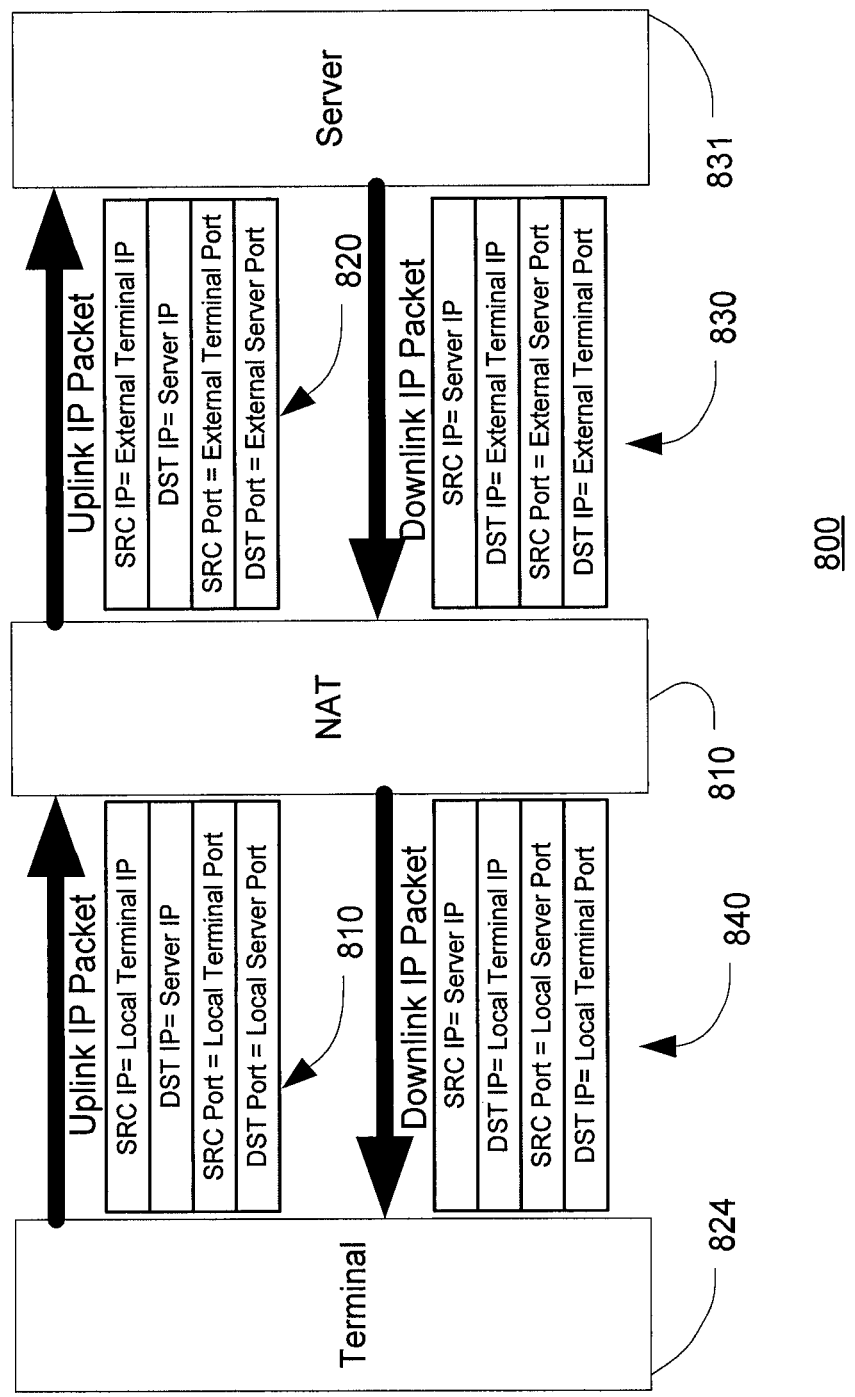
FIG. 8 illustrates an example sequence diagram of the data flow between a client, a network address translation device and a server according to an embodiment of the present invention.

FIG. 8 illustrates an example sequence diagram of the data flow in an example system comprising terminal 824, NAT 810 and server 831 that allows the terminal 824 to dynamically setup a secure micro port forwarding (MPF) rule with the NAT 810 to allow the server 831 to be able to communicate with the terminal 824. The sequence diagram 800 illustrates data packet flow between terminal 824, NAT device 810 and server 831 according to an embodiment of the present invention. Indicated are only the identifiers of respective data packets 810, 820, 830, and 840 and an example of how they may be transformed by the NAT device 810 according to an embodiment of the present invention. It is noted that the elements of an identifier within a data packet are not required to be arranged in a contiguous fashion as illustrated but may be dispersed across a number of locations within a data packet. It is further noted that FIG. 8 illustrates the data flow between terminal 824, NAT device 810 and server 831 as an example for the data flow between clients and servers as mediated by a NAT device 810 according to the present invention in general.

Figure 9:
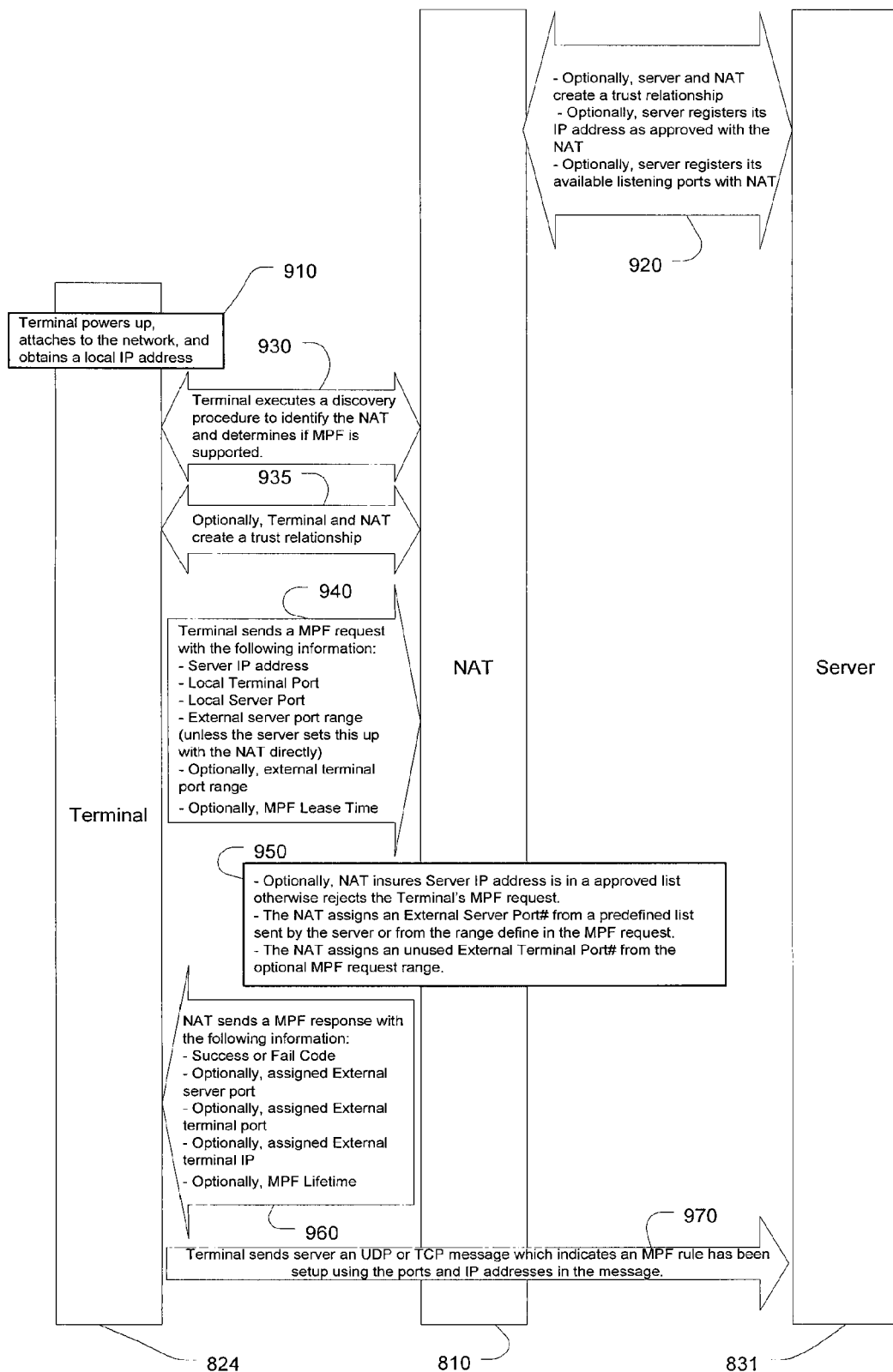
FIG. 9 illustrates a sequence diagram of an example method according to another embodiment of the present invention.
Figure 10:
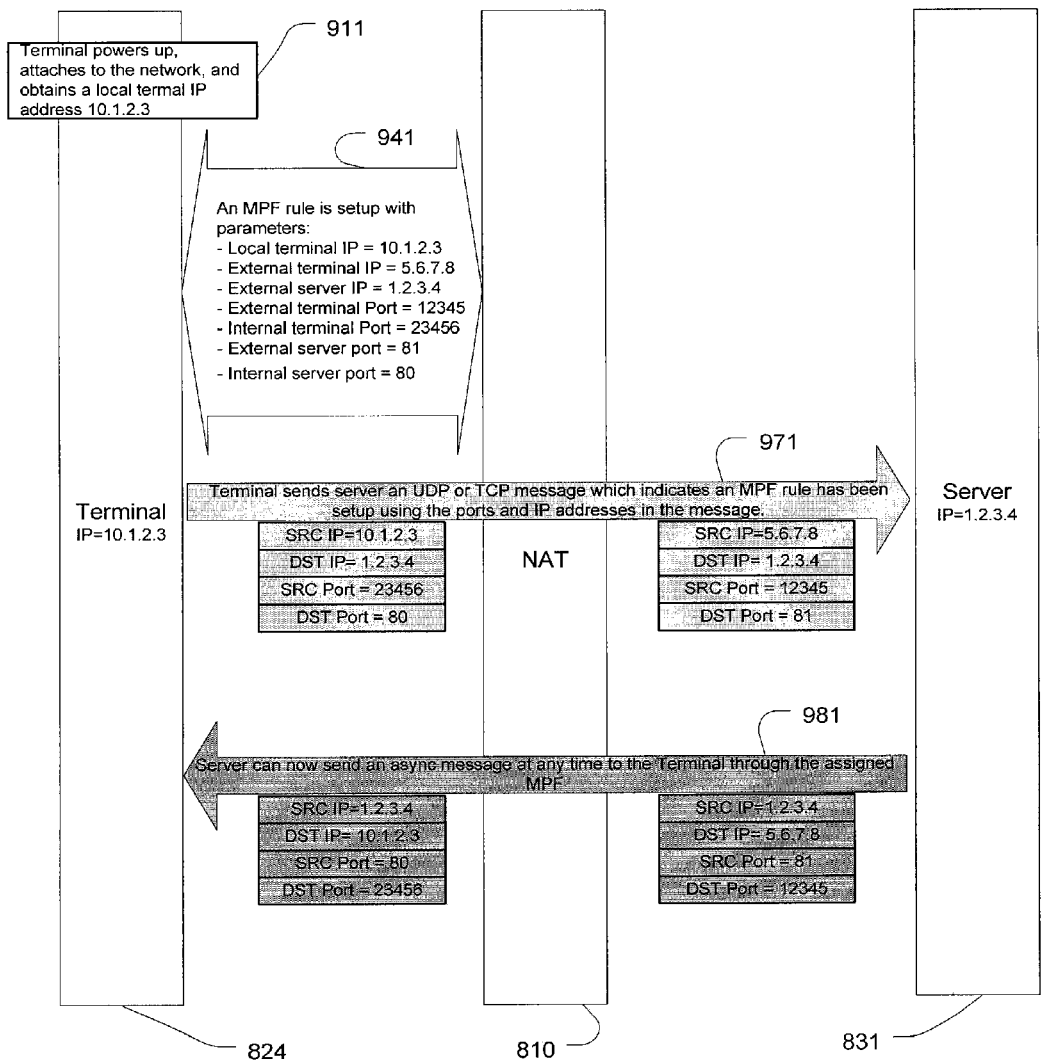
FIG. 10 illustrates a sequence diagram of an example method according to another embodiment of the present invention.

FIG. 9 illustrates the generalized steps in a sequence diagram according to the present example for setting up MPF rules. FIG. 9 includes steps for setting up trust relationships (NAT-Server and NAT-Terminal). Mechanisms to set up trust relationships are well known to those skilled in the art of security. An example of such a mechanism is to use a public/private key exchange mechanism. In addition, FIG. 10 illustrates a specific MPF sequence diagram.

The sequence diagram of FIG. 9 illustrates various communications and procedures employing communication using an IP protocol between terminal 824, NAT device 810, and server 831. A number of communications may occur during terminal initialization 910 when terminal 824 is activated, which may include assignment of a network address and activation of terminal 824 with that network address and thereby registering terminal 824 with the mobile network. Terminal 824 subsequently performs a discovery procedure 930 during which terminal 824 determines the presence of NAT device 810. Terminal 824 and NAT device 810 establish a trust relationship as illustrated in communication 935. A number of methods and protocols for establishing a trust relationship known in the art may be employed in this embodiment of the present invention.

Communication 920 may occur independently from communications between terminal 824 or other terminals in the mobile network and NAT device 810. Server 831 may be configured to establish a trust relationship between server 831 and NAT device 810 if both are adequately configured. Upon establishing a trust relationship, server 831 may request release of its network address and its addition to an approved server network address list with NAT device 810. Server 831 may register numbers of open ports with NAT device 810, at which server 831 will accept incoming data packets for processing. One or more of the described communications between server 831 and NAT device 810 may be performed at any time.

Once a DFR has been established, terminal 824 establishes a communication 970 with server 831 providing detailed information about the activated DFR. Server 831 may communicate with terminal 824 and submit corresponding data packets for as long as the DFR is active as indicated by reference numeral 980.

According to an embodiment of the present invention, FIG. 10 illustrates the communications for setting up a specific MPF using an internal source IP address=10.1.2.3, an internal destination IP address=1.2.3.4, an internal source port number=23456, an internal destination port number=80, an external source IP address=5.6.7.8, an external destination IP address=1.2.3.4, an external source port number=12345 and an external destination port number=81. The terminal 824 initially powers up 911 and attaches to the network and obtains the internal source IP address. Subsequent interaction between the terminal 824 and the NAT 810, enables an MPF rule setup 941 with particular parameters. The terminal 824 can then send server 831 an UDP or TCP message 971 which indicates an MPF rule has been setup using the ports and IP address which is included in the message. The server 831 subsequently sends an asymmetric message to the terminal 824 through or using the assigned MPF 981, which the server 831 had previously received from the terminal 824.

The example system may optionally be configured to provide one or more predetermined functions regarding port scalability, address scalability, routing security, and malware security aspects. For example, with standard port forwarding an external terminal port would never be forwarded if that port was already used for another external terminal IP address and a terminal would then have to engage with a NAT device in a trial and error process to find an unused external terminal port. The present example system, however, may be configured to communicate one or more ranges of external terminal port numbers and/or server port numbers. For IP, each range may include up to the entire $2^{16}$ possible port numbers and the NAT device may use each range to determine an available port number for activation with the MPF. Hence, the example system may be configured to provide port scalability in combination with other address translation or port forwarding methods such as port address translation (PAT), for example.

The example system may further optionally be configured to provide PAT, which may increase the computational burden on the NAT. With PAT, however, static local port numbers may be assigned to terminals which may simplify terminal and network configuration. According to the present example system, if no PAT is used, the local host and/or server ports in the MPF request may be set to zero in order to indicate PAT is not required. If PAT is not used, the NAT must include the external terminal port number and internal terminal port number that the NAT has assigned in the MPF response.

With regard to address scalability, standard port forwarding can provide no more than $2^{16}$ possible routing paths (based on using all 16-bits of the external terminal port number) per combination of server and external server port number. The present example system, however, may optionally be configured to route additionally based on the external server port number in order to lift the limitation on the number of possible routing paths to provide an increased number of available routing paths from $2^{16}$ to $2^{32}$, by adding the external server port number as a routing dependency. With this additional dependency, NAT according to the present example system can employ MPFs for routing inbound packets to the terminal if the IP address equals the Server IP address, DST Port# equals the External Terminal Port#, and SRC Port# equals the External Server Port#.

Because port numbers 0 to 1023 have been assigned standard functions by IANA the range of port numbers available for MPF may be restricted. Excluding 1024 port numbers, however, still allows combining two port ranges each providing $2^{16}-1024$ port numbers which yields more than 4 billion $(2^{16}-1024)^2$ possible routing paths per server per IPv4 routable address. The example system may be configured to use the whole or a portion of $2^{16}-1024$ port numbers for MPF. Both, terminals and servers may be configured to operate based on a predetermined range of port numbers. Optionally, the terminal can communicate to the server directly to determine the server's supported external server port range. Terminals may be configured to negotiate a local server port number and/or a local terminal port number which may be performed without limiting the number of routing paths through the NAT.

With regard to routing security, using narrow port forwarding, which only forwards traffic from a specific server IP address, can be much more secure than general port forwarding. The example system optionally may be configured to provide security by having the NAT device maintain a white list of approved server IP addresses and/or ports thereof, so that the NAT activates MPF rules only if the server IP address is included in the list. Further optionally, the system may be configured to use a black list so the NAT rejects corresponding MPF rule requests with blacklisted server IP addresses and/or ports thereof. Management of a white list and/or a black list may require additional computational effort.

The example system may further optionally be configured to allow a dynamic mechanism where the server first establishes a trust relationship with the NAT and consequently, the server's IP address is added to the approved server list. The terminal may be required to send a message to the server, after MPF setup procedures are completed (see FIG. 9), indicating the NAT's address or URL the server can use to contact the terminal. The server may also be required to send a message back to the terminal indicating when it has completed registration with the NAT, thus allowing the terminal to start the procedure to set up a MPF rule.

With regard to malware security, NAT port forwarding protocols such as UPnP do not require the terminal to authenticate with the NAT which allows malware and even flash applications to be able to set up a broad port forwarding rule, for example. For this example, only narrow port forwarding will be permitted which will reduce this risk substantially. From a security and routing perspective, an MPF rule acts the same as a normally created routing path through the NAT with the only difference being that the MPF rule may not require keep-alive messages to keep it open.

The example system may optionally be configured to provide further security functions by requiring the terminal to authenticate with the NAT device before being able to set up an MPF rule. With this added level of security, the MPF mechanism can become more resilient against a number malware attacks. Optionally, the NAT can aid in security by not allowing any local traffic between the terminals which prevents an infected terminal from infecting the others.

This and other examples may be implemented in UPnP and employed as an alternative to the Internet Gateway Device (IGD) Protocol. The UPnP (Universal Plug and Play) and IGD protocols can be used to implement the MPF mechanism of the example system. Both IGD and UPnP optionally support "narrow" port mapping (mapping to a specific server) and/or PAT and setting predetermined lease durations.

PAT may be implemented using IGD and/or UPnP which use the variable "InternalPort" which needs to be changed and an additional variable "InternalServerPort" needs to be created. With standard IGD, PAT is disabled when the "InternalPort" equals the "ExternalPort" which may not be a practical way to disable PAT because the value of the "ExternalPort" would not be known at the time of the request. The change would require that InternalPort=0 will be treated as an exception to indicate to the NAT that PAT is not required between the Internal Terminal Port and the External Terminal Port. The additional variable "InternalServerPort" is required to define the terminal's requested port address translation between the External Server Port number to the Internal Server Port number. Similarly, InternalServerPort=0 would require to be treated as a special case, indicating to the NAT that PAT is not required on the Server Port.

With regard to support for an optional external terminal port mapping range, a range for external terminal port mapping can be supported. This may be accomplished by treating ExtPort=0 as a special case. Using, ExtPort=0 to indicate any port may need to be redefined to evaluate a new string variable "ExtTerminalPortRange", for example, which, if null, may be defined to keep the IGD/UPnP definition of ExtPort=0, and otherwise may be used to define the external terminal port mapping range. The system may be configured so that the format of the range may be a regular expression. Regular expressions are readily known in the art.

With regard to support for an optional external server port mapping range increasing the routing paths the present system can support, the external server port number may be used as an additional routing dependency. To support this with IGD/UPnP, a new string variable, "ExtServerPortRange", for example, is required, which if null indicates no routing dependency on the external server port. Otherwise, the variable "ExtServerPortRange" defines the available external server port mapping range. The range may be encoded using regular expressions.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for forwarding data between a first network and a second network, the first network and the second network being operatively connected, the method comprising:
receiving, reconfiguring and forwarding a first data packet from the first network to the second network, the reconfiguring comprising mapping, in accordance with a reversible data-forwarding rule (DFR), a first source address of the first data packet to a second source address, a first source port number of the first data packet to a second source port number, and a first destination port number of the first data packet to a second destination port number, said DFR established in response to a DFR request wherein the first source address is different from the second source address, the first source port number is different from the second source port number, and the first destination port number is different from the second destination port number; and receiving, reconfiguring and forwarding a second data packet from the second network to the first network if a source address of the second data packet corresponds with a first destination address of the first data packet, a destination address of the second data packet corresponds with the second source address, a source port number of the second data packet corresponds with the second destination port number and a destination port number of the second data packet corresponds with the second source port number, wherein reconfiguring the second packet comprises mapping the destination address thereof based at least in part on the source address, the source port number and the destination port number of the second packet, in accordance with a reverse mapping of the DFR, wherein the second destination port number is selected, during establishment of the DFR, to create a unique correspondence between a combination of the first source address and the first source port number with respect to a combination of the second source port number, the second destination port number and the first destination address, wherein establishment of the DFR is made relative to other established DFRs.

2. The method according to claim 1, wherein the DFR request is from a device within the first network or the second network.

3. The method according to claim 1, wherein said DFR request results in activation of a previously inactive DFR.

4. The method according to claim 1, wherein said DFR request is encoded within the first data packet or the second data packet.

5. The method according to claim 1, wherein the first data packet further comprises a first data payload, the first data payload forwarded to the second network in one or more packets.

6. The method according to claim 1, wherein the second source address is predetermined.

7. The method according to claim 1, wherein the second data packet further comprises a second data payload, the second data payload forwarded to the first network in one or more packets.

8. The method according to claim 1, wherein said reconfiguring of the second data packet is performed only if the source address, source port number and destination port number thereof collectively meet a predetermined approval criterion.

9. The method according to claim 1, wherein the DFR request is from a device within the first network, and wherein establishing the DFR includes determining the second source address, the second source port number and the second destination port number.

10. The method according to claim 9, wherein the second source address is predetermined.

11. The method according to claim 9, wherein establishing the DFR includes specifying, by the device within the first network, one or more sets of port numbers, wherein one or both of the second source port number and second destination port number are selected from a corresponding one of said one or more sets of port numbers.

12. The method according to claim 9, wherein one or more of the second source address, the second source port number and the second destination port number are selected from a corresponding predeteiniined pool.

13. The method according to claim 1, wherein said reconfiguring of the first data packet is performed only if a destination address of the first data packet meets a predetermined approval criterion.

14. An apparatus for forwarding data between a first network and a second network, the apparatus for operatively connecting the first and the second network, the apparatus comprising:

a first network interface operatively connected to the first network for receiving one or more first data packets from the first network and for forwarding one or more second data packets to the first network;

a second network interface operatively connected to the second network for receiving the one or more second data packets from the second network and for forwarding the one or more first data packets to the second network; and a packet-processing system operatively connected to the first network interface and the second network interface, the packet-processing system configured to reconfigure each of the first data packets, if the first destination address is associated with the second network, the reconfiguring of the first data packets comprising mapping, in accordance with a reversible data-forwarding rule (DFR), a first source address of the first data packet to a second source address, a first source port number of the first data packet to a second source port number and a first destination port number of the first data packet to a second destination port number, said DFR established in response to a DFR request, wherein the first source address is different from the second source address, the first source port number is different from the second source port number, and the first destination port number is different from the second destination port number, the packet processing system further configured to reconfigure each of the second data packets, if a source address of the second data packet corresponds with a first destination address of the first data packet, a destination address of the second data packet corresponds with the second source address, a source port number of the second data packet corresponds with the second destination port number and a destination port number of the second data packet corresponds with the second source port number, the reconfiguring of the second packets comprising mapping the destination address thereof based at least in part on the source address, the source port number and the destination port number of the second packet, in accordance with a reverse mapping of the DFR, wherein the apparatus is configured to select the second destination port number, during establishment of the DFR, so as to create a unique correspondence between a combination of the first source address and the first source port number with respect to a combination of the second source port number, the second destination port number and the first destination address, wherein establishment of the DFR is made relative to other established DFRs.

15. The apparatus according to claim 14, wherein the DFR request is from a device within the first network or the second network.

16. The apparatus according to claim 14, wherein said DFR request results in activation of a previously inactive DFR.

17. The apparatus according to claim 14, wherein said DFR request is encoded within the first data packet or the second data packet.

18. The apparatus according to claim 14, wherein at least one of the first data packets further comprises a first data payload, and wherein the apparatus is configured to forward the first data payload to the second network in one or more packets.

19. The apparatus according to claim 14, wherein the second source address corresponds with a network address of the apparatus, said network address associated with the second network.

20. The apparatus according to claim 14, wherein the one or more second data packets further comprise a second data payload, and wherein the apparatus is configured to forward the second data payload to the first network in one or more packets.

21. The apparatus according to claim 14, wherein said reconfiguring of each of the second data packets is performed only if the source address, source port number and destination port number thereof collectively meet a predetermined approval criterion.

22. The apparatus according to claim 14, wherein the packet-processing system is configured to reconfigure the first data packets only if a destination address of the first data packets meets a predetermined approval criterion.

23. The apparatus according to claim 14, wherein the DFR request is from a device within the first network, and wherein establishing the DFR includes specifying, by the device within the first network, one or more sets of port numbers, wherein one or both of the second source port number and second destination port number are selected from a corresponding one of said one or more sets of port numbers.

24. The apparatus according to claim 14, wherein the packet-processing system is configured to select one or more of the second source address, the second source port number and the second destination port number from a corresponding predetermined pool.

25. A computer program product comprising a memory having embodied thereon statements and instructions for execution by a computer, thereby causing the computer to perform a method for forwarding data packets between a first network and a second network, the method comprising the steps of:

receiving, reconfiguring and forwarding a first data packet from the first network to the second network, the reconfiguring comprising mapping, in accordance with a reversible data-forwarding rule (DFR), a first source address of the first data packet to a second source address, a first source port number of the first data packet to a second source port number, and a first destination port number of the first data packet to a second destination port number, said DFR established in response to a DFR request, wherein the first source address is different from the second source address, the first source port number is different from the second source port number, and the first destination port number is different from the second destination port number; and receiving, reconfiguring and forwarding a second data packet from the second network to the first network if a source address of the second data packet corresponds with a first destination address of the first data packet, a destination address of the second data packet corresponds with the second source address, a source port number of the second data packet corresponds with the second destination port number and a destination port number of the second data packet corresponds with the second source port number, wherein reconfiguring the second packet comprises mapping the destination address thereof based at least in part on the source address, the source port number and the destination port number of the second packet, in accordance with a reverse mapping of the DFR, wherein the second destination port number is selected, during establishment of the DFR, to create a unique correspondence between a combination of the first source address and the first source port number with respect to a combination of the second source port number, the second destination port number and the first destination address, wherein establishment of the DFR is made relative to other established DFRs.

26. The computer program product according to claim 25, wherein the DFR request is from a device within the first network or the second network.

27. The computer program product according to claim 25, wherein said DFR request results in activation of a previously inactive DFR.

28. The computer program product according to claim 25, wherein said DFR request is encoded within the first data packet or the second data packet.

* * * * *

UNITED STATES PATENT AND TRADEMARK OFFICE
CERTIFICATE OF CORRECTION

PATENT NO.         : 8,812,730 B2                                  Page 1 of 1
APPLICATION NO.    : 13/109342
DATED              : August 19, 2014
INVENTOR(S)        : Vos et al.

It is certified that error appears in the above-identified patent and that said Letters Patent is hereby corrected as shown below:

In the Specification
Col. 16, Line 45 changed from "2^46" to --2^16--
Col. 16, Line 48 changed from "2^46×2^16=2^32" to --2^16×2^16=2^32--

In the Claims
Col. 27, Claim 12, Line 4 changed from "predeteiniined" to --predetermined--

Signed and Sealed this
Thirtieth Day of June, 2015

Michelle K. Lee
*Director of the United States Patent and Trademark Office*